US012062938B2

(12) United States Patent
Kun et al.

(10) Patent No.: US 12,062,938 B2
(45) Date of Patent: Aug. 13, 2024

(54) PARALLEL CHARGING

(71) Applicant: Qualcomm Incorporated, San Diego, CA (US)

(72) Inventors: Cheong Kun, San Diego, CA (US); Chunping Song, Palo Alto, CA (US); Guoyong Guo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/025,789

(22) Filed: Sep. 18, 2020

(65) Prior Publication Data

US 2021/0083501 A1    Mar. 18, 2021

Related U.S. Application Data

(60) Provisional application No. 62/902,307, filed on Sep. 18, 2019.

(51) Int. Cl.
*H02J 7/00* (2006.01)

(52) U.S. Cl.
CPC ........ *H02J 7/00714* (2020.01); *H02J 7/0047* (2013.01); *H02J 2207/20* (2020.01); *H02J 2207/40* (2020.01)

(58) Field of Classification Search
CPC .. H02J 7/00714; H02J 7/0047; H02J 2207/20; H02J 2207/40; H02J 50/00; H02J 7/007182
USPC ......................................... 320/138, 140, 162
See application file for complete search history.

(56) References Cited

U.S. PATENT DOCUMENTS

| | | | |
|---|---|---|---|
| 9,276,430 B2 | 3/2016 | Sporck et al. | |
| 9,977,091 B2* | 5/2018 | Hawawini | G01R 31/3648 |
| 2007/0241732 A1* | 10/2007 | Luo | H02M 3/1584 |
| | | | 323/281 |
| 2010/0079000 A1* | 4/2010 | Yamamota | H02J 7/0018 |
| | | | 307/39 |
| 2012/0293021 A1* | 11/2012 | Teggatz | H02J 7/007192 |
| | | | 307/151 |
| 2017/0005501 A1 | 1/2017 | Yi et al. | |
| 2018/0026316 A1* | 1/2018 | Teng | H02J 7/0019 |
| | | | 320/134 |

(Continued)

FOREIGN PATENT DOCUMENTS

CN    101820176 B    8/2013

OTHER PUBLICATIONS

Hu J., et al., "Master-Slave Battery Charging System Using Parallel DC-DC Converters for Thermal Safety", 2017 IEEE International Symposium on Circuits and Systems (ISCAS), May 28-31, 2017, 4 pages.

(Continued)

*Primary Examiner* — Edward Tso
*Assistant Examiner* — Aaron Piggush
(74) *Attorney, Agent, or Firm* — Colby Nipper PLLC

(57) ABSTRACT

An apparatus is disclosed for parallel charging of at least one power storage unit. In example implementations, an apparatus includes a charging system. The charging system includes a first charger having a first current path and a second charger having a second current path. The charging system also includes a charging controller coupled to the first current path. The charging system further includes an indication path coupled between the second current path and the charging controller.

30 Claims, 11 Drawing Sheets

(56) References Cited

U.S. PATENT DOCUMENTS

| | | |
|---|---|---|
| 2018/0205253 A1* | 7/2018 | Kwak ................ H02J 7/0036 |
| 2018/0331564 A1 | 11/2018 | Song et al. |
| 2019/0013685 A1* | 1/2019 | Mallapur ................ H02J 1/10 |
| 2019/0348849 A1 | 11/2019 | Kun et al. |
| 2022/0302734 A1 | 9/2022 | Fei et al. |

OTHER PUBLICATIONS

NXP: "NXP Type-C End-to-End Fast Charging 8 A Total Solution", Document No. E2EFAST8ATOTAL Rev 0, Apr. 2, 2019, 2 pages.

* cited by examiner

PARALLEL CHARGING

CROSS-REFERENCE TO RELATED APPLICATION

This application claims the benefit of U.S. Provisional Application No. 62/902,307, filed 18 Sep. 2019, the disclosure of which is hereby incorporated by reference in its entirety herein.

TECHNICAL FIELD

This disclosure relates generally to charging electronic devices and, more specifically, to implementing a parallel charging architecture.

BACKGROUND

Portable electronic devices include traditional computing devices such as notebook computers, tablet computers, smartphones, wearable devices like a smartwatch or fitness tracker, and so forth. However, portable electronic devices also include other types of computing devices such as personal voice assistants, thermostats and other automated controllers, security devices and other sensors, Internet of Things (IoT) devices, power tools, drones and robotics, electric and hybrid vehicles, and so forth. These various electronic devices provide services relating to productivity, communication, social interaction, security, safety, remote management, entertainment, transportation, and information dissemination. Thus, portable electronic devices play crucial roles in many aspects of modern society.

Many of the services provided by portable electronic devices in today's interconnected and mobile world depend at least partly on the "portable" aspect of portable electronic devices. To provide power to portable electronic devices, batteries are often employed. Batteries are reliable and portable energy sources that are used by a wide range of electronic devices, such as mobile phones, laptops, toys, power tools, medical device implants, electrically-powered vehicles, and satellites. A battery, however, stores a fixed amount of charge that is depleted during mobile operation of the portable electronic device. Instead of requiring the purchase of a replacement battery, many batteries are rechargeable via an external power source. Such a battery can therefore be reused multiple times through recharging.

In some battery recharging scenarios, an electronic device can be operated during the charging process. For example, a user may charge a battery on a smartphone while using the device to make a phone call, watch a movie, play a game, engage with social media, or search the Internet. Performing these operations, however, may be limited to a particular physical range between the device and an external power source. External power sources include a charging cord and associated adapter, which may be plugged into a wall socket, and a wireless charging pad. The wireless charging pad may also be tethered to a wall socket via a cable, may be embedded in the ground or another object, or may be otherwise relatively immobile. During these times when the battery is being charged, the portable electronic device effectively forfeits much of the portability of the device.

Accordingly, the inconvenience of charging an electronic device can be decreased by reducing an amount of time a portable electronic device undergoes a charging procedure. Electrical engineers and other designers of electronic devices are therefore striving to reduce charging times for portable electronic devices and other battery-powered devices.

SUMMARY

In example implementations, a charging system can include multiple chargers, such as a first charger and a second charger. The first charger includes a first current path, and the second charger includes a second current path. A charging controller can have access to each current path. For instance, the charging controller can be coupled to the first current path, and an indication path can be coupled between the second current path and the charging controller. The charging controller can use the access to each current path to obtain an indication of a first current flowing in the first current path and an indication of a second current flowing in the second current path. This enables the charging controller to control operation of the charging system based on the currents flowing in the first current path and in the second current path. The charging controller can therefore implement a control loop using more than a single current, such as by basing charging decisions on an indication of a combined current that is distributed across the multiple chargers of a parallel charging system. In these manners, a charging controller can operate a parallel charging system based on current flows within each of multiple chargers. Thus, certain described implementations can combine the efficient power dissipation characteristics of parallel charging schemes with a unified control paradigm to safely operate multiple chargers.

In an example aspect, an apparatus for parallel charging at least one power storage unit is disclosed. The apparatus includes a charging system. The charging system includes a first charger with a first current path and a second charger with a second current path. The charging system also includes a charging controller coupled to the first current path. The charging system further includes an indication path coupled between the second current path and the charging controller.

In an example aspect, an apparatus for charging at least one power storage unit is disclosed. The apparatus includes a first charger having means for propagating a first current. The apparatus also includes a second charger having means for propagating a second current. Additionally, the apparatus includes first means for indicating the first current and second means for indicating the second current. The apparatus also includes means for generating a combined indication signal responsive to the first means for indicating and the second means for indicating. The apparatus further includes means for controlling a charging of the at least one power storage unit based on the combined indication signal.

In an example aspect, a method for operating a charging system is disclosed. The method includes obtaining a first indication signal indicative of a first current flowing through a first current path of a first charger. The method also includes obtaining a second indication signal indicative of a second current flowing through a second current path of a second charger. The method additionally includes combining the first indication signal and the second indication signal to produce a combined indication signal. The method further includes controlling the charging system based on the combined indication signal.

In an example aspect, an apparatus for parallel charging is disclosed. The apparatus includes a charging system. The charging system includes a charging voltage node and a buck charger having a current path. The charging system also includes a charge pump charger having a current path, with the current path of the charge pump charger coupled to the charging voltage node. The charging system additionally includes a charging controller coupled to the current path of the buck charger. The charging system further includes an indication path coupled between the charging controller and the current path of the charge pump charger, with the indication path configured to provide an indication of a current flowing though the current path of the charge pump charger.

BRIEF DESCRIPTION OF DRAWINGS

FIG. 2-1 illustrates an example charging system that includes at least one charger and a charging controller and that is coupled to one or more other components.

FIG. 2-2 illustrates an example multiple charger architecture distributed across multiple printed circuit boards (PCBs).

FIG. 3-1 is a schematic diagram illustrating an example charging system with multiple chargers, an indication signal combiner, and a charging controller.

FIG. 3-2 is a schematic diagram illustrating an example charging system with multiple chargers that are coupled together in a parallel charging architecture providing at least one indication signal of a current flowing through a current path of a charger.

FIG. 5-1 is a schematic diagram illustrating an example charging controller and example charger circuitry.

FIG. 5-2 is a flow chart illustrating example control loop types including those that may operate with a charging controller based on a combined indication signal.

FIG. 6-1 is a circuit diagram illustrating an example first charger that is realized as a "main" charger of a charging system.

FIG. 6-2 is a circuit diagram illustrating an example second charger that is realized as a "secondary" charger of the charging system of FIG. 6-1.

DETAILED DESCRIPTION

Figure 1:
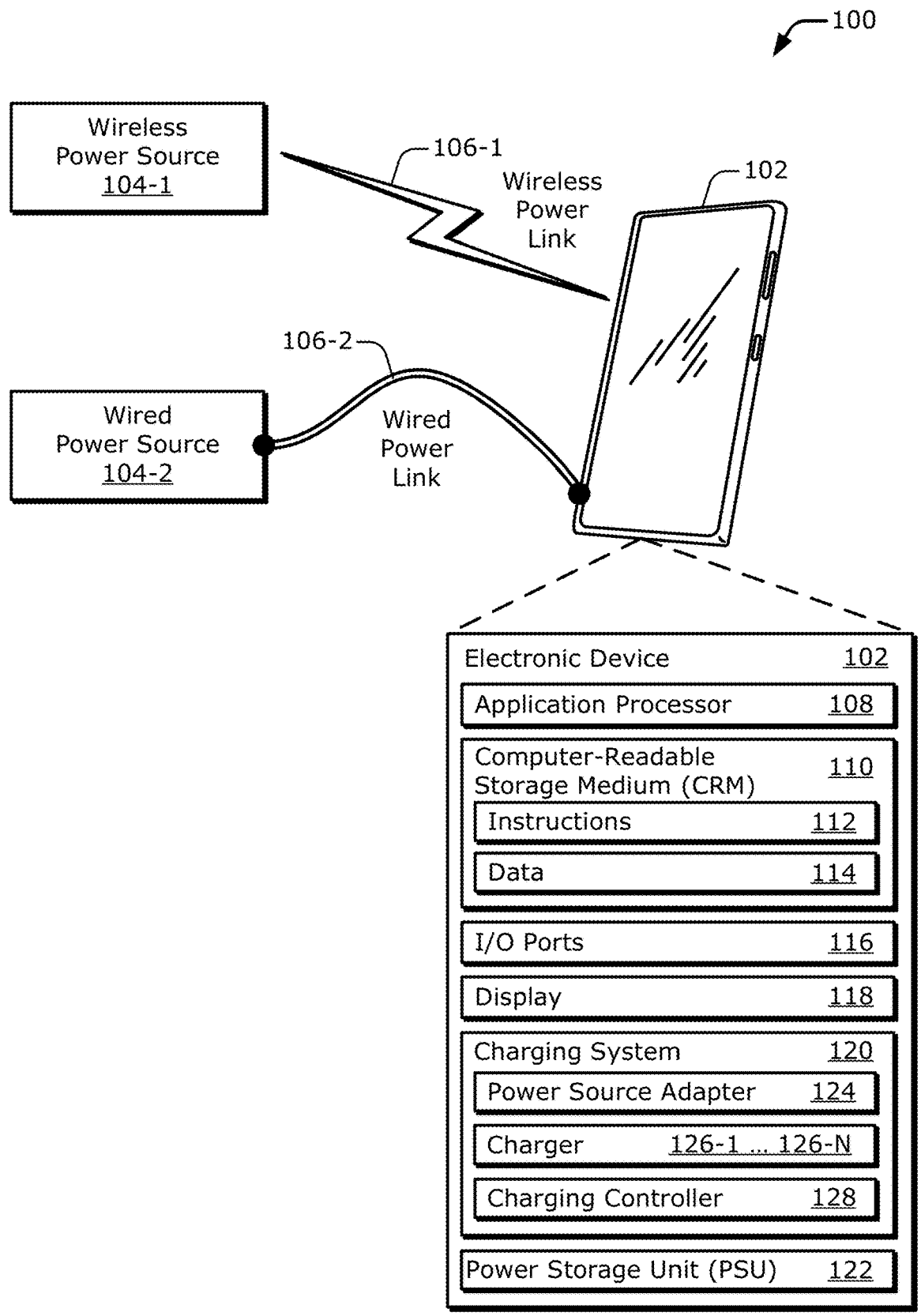
FIG. 1 illustrates an environment depicting an example electronic device having a charging system including a parallel charging architecture.

Generally, a battery is charged by supplying a current to the battery. A duration of a charging procedure can therefore be reduced by increasing a size or magnitude of the current being supplied to the battery. Higher currents, however, rapidly increase power dissipation because the dissipated power is related to a square of the magnitude of the current. The power dissipation generates heat and wastes energy during the charging process. To reduce a level of any one particular current, a total current can be separated into multiple currents. The multiple currents are then supplied to the battery using multiple chargers. By separating the total current into multiple currents, total power dissipation is decreased due to the power being related to the square of the magnitude of the current, as is described further below. Moreover, with multiple currents being employed for the charging procedure, at least one of the currents can be supplied using a relatively higher efficiency type of charger, such as a charge pump.

Employing multiple currents to charge a battery, however, causes the control of the charging procedure to become challenging. Each respective charger contributes to the charging operation a respective current, which may be a portion of a total current supplied to a battery. A controller for a respective charger can control the charger based on a magnitude of the respective current. The controller cannot, however, absent knowledge of the other currents, implement a control loop that accounts for the multiple currents or the total charging current.

Consequently, one or more currents can veer out of a target range and cause charging instability, which can result in a charger shutting down or can produce a dangerous overheating condition. For example, if the controller is unaware of other currents of the multiple currents, the controller cannot moderate an input current of a charging system to protect a power source adapter of an electronic device. Additionally, the controller cannot prevent an excessive amount of current from being applied to a battery if the controller is unaware of the respective charging current being supplied by each respective charger of multiple chargers. This document addresses these and other battery charging issues below.

To shorten the time to recharge a battery of an electronic device, a rate of charging can be increased. In other words, charging can occur faster as more charge or a higher current is provided to the battery in a given period of time. This faster rate of charging can be attained by increasing a magnitude of a current being applied to the battery. A charging time can be halved, for instance, by doubling an amperage of a current applied to the battery. Increasing the amperage of a current can, unfortunately, create thermal issues as power dissipation occurs due to the current traversing one or more circuit components as part of the battery charging procedure. This power dissipation generates heat, and the heat generation wastes power and can damage parts of the electronic device, or even risk a fire starting with the battery.

An amount of power dissipation is based on both the current flowing through a given circuit component and a resistance value of the circuit component. The current portion of the power dissipation relationship can dominate over the resistance portion because a square of the current magnitude affects the power level. Specifically, dissipated power (Pdiss) is related to, or can equal, a square of the current (i), which is flowing through the circuit component, multiplied by a resistance (R) of the circuit component (Pdiss=$i^2$*R). Due to the squared factor, a change in a magnitude of a current that is used for charging can appreciably impact an amount of power dissipation.

In various architectures, such as some parallel charging architectures, a total charging current is separated into multiple charging currents that sum to the total charging current. This reduces a total power dissipation because a sum of the squares of individual charging currents has a lower impact on the total power dissipation than a square of the sum of the individual charging currents. This is true even when accounting for resistance values in the power dissipation relationship. In other words, a sum of squares of multiple currents (e.g., $3^2+3^2=18$ or $4^2+2^2=20$) is less than a square of the sum of the multiple currents (e.g., $6^2=36$, where the sum of the multiple current is 6). Thus, power dissipation can be reduced by employing a parallel charging architecture with multiple individual charging currents. A parallel charging architecture, however, complicates a control of the charging procedure as the individual charging currents are distributed across multiple chargers.

With a non-parallel charging architecture, a charging controller can base charging decisions on a magnitude of a single current that flows through a single charger. The charging controller can therefore control a total input current that is received from an external power source or a total charging current applied to a battery by accessing or otherwise obtaining an indication of a magnitude of the single current flowing through the single charger. For example, the charging controller can limit a maximum total input current that is drawn by the single charger or maintain a constant current that the single charger supplies to a battery using information about a single input current or a single charging current, respectively.

With a first approach to a parallel charging architecture, a first charger of multiple parallel chargers can control a combined current flow. The first charger receives a combined input current. This combined input current is then split by the first charger between itself and one or more other chargers of the multiple parallel chargers. Each other charger returns a charging current to the first charger. The first charger combines the charging currents from the multiple parallel chargers to produce a combined charging current. The first charger then couples the combined charging current to the battery. By using a more-efficient charger type for at least one charger of the multiple other chargers (e.g., a charge pump charger instead of a buck charger), this first approach can increase an efficiency of a charging procedure.

This first approach also enables the first charger to monitor the combined input current and the combined charging current to control either or both currents because both combined currents are routed through the first charger. However, this first approach also causes the combined input current to flow through an input power field-effect transistor (FET) (power FET) of the first charger and causes the combined charging current to flow through a charging power FET of the first charger. These combined currents therefore cause appreciable power dissipation in these power FETs because the "summed" currents are being squared as a result of the power relationship described above.

A second approach to a parallel charging architecture enables each charger of multiple parallel chargers to receive an individual portion of a combined input current to reduce power dissipation as compared to non-parallel architectures. This second approach can further enable each charger to provide an individual portion of a combined charging current to a battery. Thus, current flow is distributed across the multiple parallel chargers, and a combined current (e.g., a combined input current or a combined charging current) does not need to be routed through any single circuit component of the multiple parallel chargers.

With the individual currents remaining separate under the second approach, the total power dissipation is reduced relative to the first approach. However, charging control is hindered with the second approach because a charging controller at a given charger (e.g., a first charger) of the multiple parallel chargers cannot adequately control the combined input current or the combined charging current. The first charger cannot adequately control the combined input current or the combined charging current because the first charger does not have access to (e.g., cannot sense) all of the individual currents that form either of these two combined currents. This lack of information can result in too high of a combined input current being drawn from an external power source, which can damage a power source adapter onboard an electronic device due to overheating. Additionally or alternatively, this information deficiency can cause a varying combined charging current to be supplied to a battery, which can adversely affect a battery's long-term health or produce unsafe operating temperatures.

In contrast, with example implementations as described herein, parallel charging architectures combine the advantages of both the first and second approaches above. For example, described parallel charging architectures can control a combined current flow while also enabling multiple parallel chargers to apportion the combined current flow into individual current portions to reduce combined power dissipation. Further, one or more chargers of the multiple parallel chargers can have a more efficient charging topology, even at the expense of some individual self-regulation capability. The multiple chargers include a first charger and one or more other chargers.

In operation, each other charger of the multiple chargers can provide to the first charger at least one respective indication signal of a respective current flowing through the respective other charger. Based on the multiple indication signals, a charging controller at the first charger can determine a combined current flowing across the multiple chargers. The charging controller can therefore base charging decisions on the combined current that is distributed across the multiple chargers. The combined current can correspond to or can include, for example, a combined input current or a combined charging current, or both.

In other example implementations, the charging controller can be implemented separately from the first charger. In such cases, the first charger includes a first current path, and a second charger of the multiple chargers includes a second current path. The "separate" charging controller has access to each current path. Thus, a first indication path couples the charging controller to the first current path, and a second indication path couples the charging controller to the second current path. A charging system can also include a signal combiner. The signal combiner can combine indication signals, which are obtained via the first and second indication paths and indicate respective currents, to produce a combined indication signal. The charging controller can receive the combined indication signal from the signal combiner and control the charging system based on the combined indication signal. The respective currents flowing in each current path can correspond to input currents received from a power source adapter of an electronic device. Additionally or alternatively, the respective currents can correspond to charging currents that are supplied from the charging system to a power storage unit, such as a battery, of the electronic device.

In some implementations, at least one respective current sensor is included in each respective charger of multiple chargers. The respective current sensor, such as a current mirror, senses a current flowing through a respective current path of the respective charger. The sensed current is then propagated to a signal combiner as an indication signal. The indication signal can be realized as a current-based signal or as a voltage-based signal. If a second indication signal corresponding to a second charger indicates that a second current thereof is increasing, the charging controller may, for instance, lower a first current of a first charger to compensate and keep a combined current at a target current magnitude.

A combined indication signal, which is produced from multiple indication signals, can be used to implement different control loops. Examples of control loops include a constant-current charging control loop, a constant-voltage charging control loop, and an input-current moderation control loop. In some cases, each charger of the multiple chargers is disposed on a single printed circuit board (PCB) for simplicity or to conserve space. In other cases, at least one charger is disposed on a different PCB to spatially distribute the chargers and thereby facilitate heat dissipation within an electronic device. In any of these cases, the charging controller can be incorporated with one of the multiple chargers or can be separate from each on a same or a different PCB.

With a current-based control loop, a charging controller can make charging decisions based on a respective indication signal from a respective charger, based on a combined indication signal, and so forth. For example, if a combined indication signal is indicative that a combined input current is exceeding a safe input current magnitude, the charging controller can reduce an individual input current of a respective charger of multiple chargers. By lowering at least one individual input current, the charging controller can reduce the combined input current to a safe level. A magnitude of an individual current can be changed by adjusting at least one switching parameter, as is described herein. In another example, the charging controller can determine that a combined charging current is too high relative to a target threshold (e.g., given a battery's current charge state) based on a combined charging-current indication signal corresponding to the combined charging current. Accordingly, the charging controller can lower an individual charging current provided to the battery by a respective charger until the combined charging-current indication signal comports with a threshold value established to provide a safe charging environment.

In these manners, a charging controller can control a charging procedure based on a combined indication signal for a combined current in a charging system that provides respective indication signals from respective chargers of multiple chargers. The charging system can therefore safely and reliably operate in a parallel charging mode. The parallel charging mode enables different chargers having different charging topologies, including more-efficient ones, to be employed together in the charging system. Further, superior thermal management strategies and energy-efficient heat dissipation techniques that are available with parallel charging architectures can be employed.

FIG. 1 illustrates an example environment 100 depicting an electronic device 102 having a charging system 120 including multiple chargers 126-1 . . . 126-N, with "N" representing an integer greater than one. In the environment 100, the example electronic device 102 can be charged via a power link 106 from a power source 104, as is described below. In FIG. 1, the electronic device 102 is depicted as a smartphone. However, the electronic device 102 may be implemented as any suitable computing or other electronic device, such as any electronic device that can be powered from a power storage unit 122 (PSU 122).

Electronic devices with a power storage unit 122 can be designed to be at least temporarily separated from a grid connection or can be intended to accommodate situations lacking grid power. Thus, the electronic device 102 can comprise a portable electronic device. Examples of electronic devices include a cellular base station, broadband router, access point, cellular or mobile phone, gaming device, navigation device, media device, laptop computer, desktop computer, tablet computer, server computer, network-attached storage (NAS) device, smart appliance, vehicle-based power or charging system, Internet of Things (IoT) device, sensor or security device, asset tracker, fitness management device, wearable device such as intelligent glasses or smart watch, wireless power device (transmitter or receiver), portable battery device (e.g., portable charger), medical device, battery-backup system or device containing a battery-backup system, battery storage system (e.g., a residential or industrial device to store power from a non-constant power source such as wind or solar), an electrical or hybrid vehicle, and so forth.

Examples of a power source 104 include a wireless power source 104-1 and a wired power source 104-2. However, a power source 104 can be realized in a different manner than those described herein. The electronic device 102 can receive power from the power source 104 via a power link 106, which may be implemented as any suitable type of link that can provide power. For instance, the electronic device 102 can be coupled to the wireless power source 104-1 (e.g., an apparatus with a transmitter coil) to receive power via a wireless power link 106-1 (e.g., an electromagnetic signal). Additionally or alternatively, the electronic device 102 can be coupled to a wired power source 104-2 (e.g., a socket connected to the grid, a photovoltaic array, or a transformer adapter) to receive power via a wired power link 106-2 (e.g., a cable, cord, or wire).

Either or both of these power links 106 can be configured in accordance with a proprietary protocol or a standardized protocol, such as a Wireless Power Consortium (Qi) protocol for the wireless power link 106-1 or a Universal Serial Bus (USB) standard or a QUICK CHARGE™ protocol for the wired power link 106-2. Each power link 106 may also provide an in-band or out-of-band communication channel in conjunction with a power conduit. Generally, the power link 106 extends from the power source 104 to the electronic device 102 to provide power to the power storage unit 122 (PSU 122) via the charging system 120, both of which are described below.

As shown, the electronic device 102 includes at least one application processor 108 and at least one computer-readable storage medium 110 (CRM 110). The application processor 108 may include any type of processor, such as a central processing unit (CPU) or a multi-core processor, that is configured to execute processor-executable instructions (e.g., code) stored by the CRM 110. The CRM 110 may include any suitable type of data storage media, such as volatile memory (e.g., random-access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include one or more input/output ports 116 (I/O ports 116) or at least one display 118. The I/O ports 116 enable data exchanges or interaction with other devices, networks, or users. The I/O ports 116 may include serial ports (e.g., universal serial bus (USB) ports), parallel ports, audio ports, infrared (IR) ports, camera or other sensor ports, and so forth. The display 118 can be realized as a display screen or a projection that presents one or more graphical images provided by the electronic device 102, such as a user interface associated with an operating system, program, or application. Alternatively or additionally, the display 118 may be implemented as a display port or virtual interface through which graphical content of the electronic device 102 is communicated or presented.

Although not explicitly shown, the electronic device 102 can further include at least one wireless interface device and at least one antenna, which are coupled one to another. The wireless interface device provides connectivity to respective networks and peer devices via a wireless communication link, which may include the wireless power link 106-1. Alternatively or additionally, the electronic device 102 may include a wired interface device for communicating with another electronic device via a wired communication link, which may include the wired power link 106-2. A wireless interface device may include at least one communication processor (e.g., a modem or a signal processor), at least one transceiver, and at least one radio-frequency (RF) front-end that are operatively coupled together to provide wireless communications responsive to the power storage unit 122 containing sufficient stored power. As used herein, an operative coupling between two or more components can enable the operatively coupled components to communicate with each other, to perform a function, or to otherwise operate as described herein.

In example implementations, the charging system 120 is operatively coupled to the power storage unit 122. In operation, the charging system 120 can charge, or add power to, the power storage unit 122. Examples of the power storage unit 122 include a battery, a capacitor, combinations thereof, and so forth nickel-metal hydride, lead-acid, lithium-ion polymer, other types of lithium, and so forth. As illustrated, the charging system 120 includes at least one power source adapter 124, multiple chargers 126-1 . . . 126-N (e.g., where N>=2, thereby representing two or more chargers), and at least one charging controller 128.

The power source adapter 124 can be coupled to the power source 104 via the power link 106 in a wireless or wired form. At least one charger 126 of the multiple chargers 126-1 . . . 126-N is coupled to at least the power source adapter 124, and at least one charger 126 is coupled to at least the power storage unit 122. At least one charger 126 may also be coupled to the power source adapter 124 and the power storage unit 122. Such a charger 126 can therefore accept, via the power source adapter 124, power from the power source 104 and provide the accepted power to the power storage unit 122. The charging controller 128 is operatively coupled to at least one charger 126 of the multiple chargers 126-1 . . . 126-N. Example implementations of a charging system 120, including aspects of the multiple chargers 126-1 . . . 126-N and the charging controller 128, are described below starting with FIG. 2-1.

In some cases, the application processor 108 and the charging controller 128 can be combined into one module or integrated circuit (IC), such as a system-on-chip (SoC). Additionally, the charging controller 128 may also include a memory (not separately shown), such as a separate CRM 110, to store data and processor-executable instructions (e.g., code) to enable charging control functionality. Alternatively, the charging controller 128 can include a portion of the CRM 110 of the application processor 108 or can access the CRM 110 thereof to obtain computer-readable instructions (e.g., instructions 112). In other cases, the charging controller 128 may be combined into a module or IC with a communication processor, such as a modem or USB interface.

The charging controller 128 can be implemented as part of, or separate from, other components of the charging system 120. Further, the charging controller 128 can be implemented as a general-purpose processor, specific-purpose processor, fixed logic circuitry, hard-coded logic, a finite-state-machine (FSM), some combination thereof, and so forth. Components of the charging controller 128 can be localized at one module (e.g., an integrated circuit chip) or printed circuit board (PCB) or can be distributed across multiple modules or PCBs of the electronic device 102. Generally, the charging controller 128 at least partially controls the charging system 120 and enables charging of the power storage unit 122 to be performed.

The various components illustrated in FIG. 1 using separate schematic blocks may be manufactured or packaged in different discrete manners. For example, one physical PCB may include components of the power source adapter 124 and components of the multiple chargers 126-1 . . . 126-N, and another physical PCB may include the charging controller 128. Alternatively, one PCB may combine the charging controller 128 with at least one charger 126-1 of the multiple chargers 126-1 . . . 126-N while remaining one(s) of the multiple chargers 126-2 . . . 126-N are disposed on one or more other PCBs. An example multiple PCB implementation is described below with reference to FIG. 2-2.

Figures 1, 2:
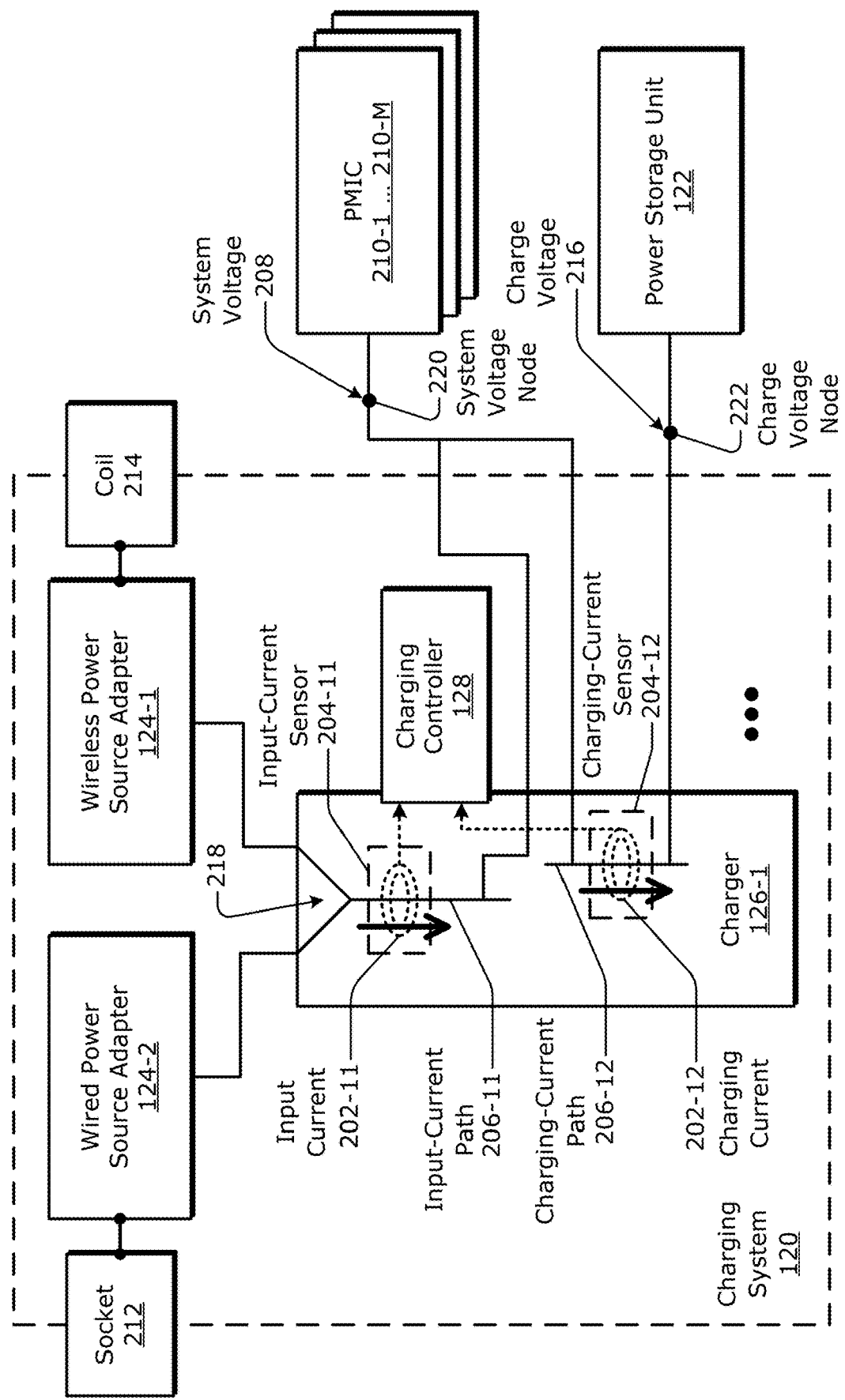
Figure 2:
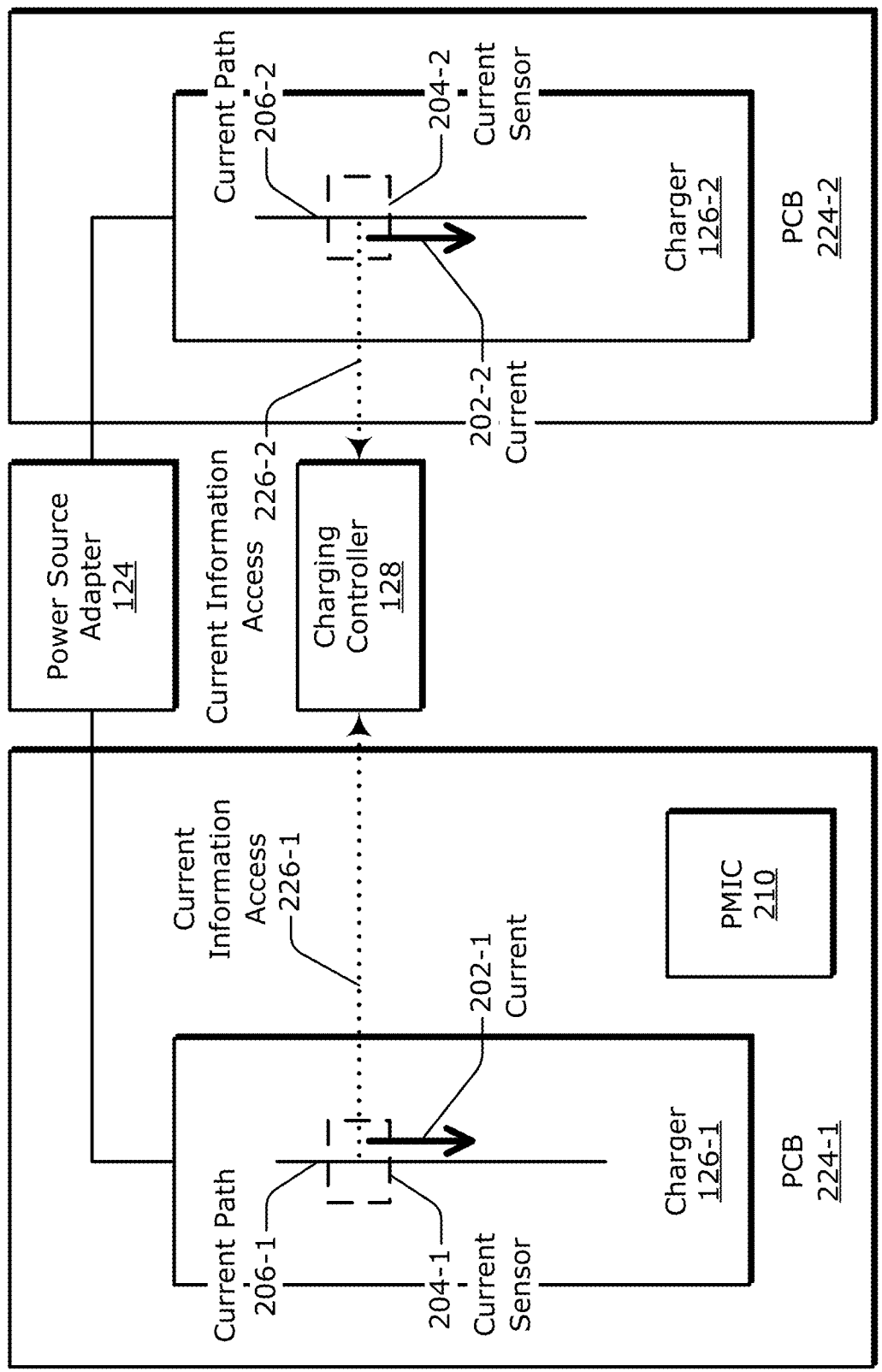

FIG. 2-1 illustrates, at 200-1 generally, an example charging system 120 including at least one charger 126-1 and a charging controller 128. The charging system 120 can be coupled to one or more other components, such as the power storage unit 122 or a power management IC 210 (PMIC 210). Although not explicitly shown in FIG. 2-1 for clarity, the charging system 120 can include other chargers of the multiple chargers 126-2 . . . 126-N (e.g., of FIGS. 1, 2-2, 3-1, 3-2, and 4). Here, the charging system 120 includes two power source adapters: a wireless power source adapter 124-1 and a wired power source adapter 124-2. The wireless power source adapter 124-1 includes or is coupled to a coil 214 to wirelessly interface with the wireless power source 104-1 via the wireless power link 106-1 (both of FIG. 1). The wired power source adapter 124-2 includes or is coupled to a socket 212 to interface with the wired power source 104-2 via the wired power link 106-2 (both of FIG. 1). However, the charging system 120 can include more, fewer, or different power source adapter(s), including multiple instances of the illustrated ones.

In example implementations, the charger 126-1 includes multiple current paths 206: an input-current path 206-11 and a charging-current path 206-12. The wireless power source adapter 124-1 and the wired power source adapter 124 2 are coupled to the input-current path 206-11 of the charger 126-1 via one or more switches 218 (not explicitly shown in FIG. 2). At least one selected power source adapter 124 provides an input current 202-11 through the input-current path 206-11. An input-current sensor 204-11 can determine (e.g., sense) the input current 202-11. A current sensor can be realized using, for instance, a current mirror, at least one switching transistor, and so forth. A current mirror implementation can be scaled such that a mirrored current has a lower magnitude than the sensed current. A current scaling can reach, e.g., 1000s of times or more (e.g., several orders of magnitude) to reduce a power utilization resulting from implementing the current mirror.

As part of a charging procedure, a system voltage 208 may be produced by, at, or outside of the charger 126-1 at a system voltage node 220. As a result of the charging procedure and the system voltage 208, a charging current 202-12 flows through the charging-current path 206-12. A charging-current sensor 204-12 can determine (e.g., sense) the charging current 202-12. A signal indicative of the charging current 202-12 ("indication signal" as depicted with a short-dashed line) can be provided from the charging-current sensor 204-12 to the charging controller 128. Similarly, the input-current sensor 204-11 can provide a signal indicative of the input current 202-11 ("indication signal" as depicted with a short-dashed line) to the charging controller 128. These indication signals are illustrated with short-dashed lines in FIGS. 2-1 and 2-2 and are described below with reference to FIGS. 3-1 and 3-2.

The charger 126-1 is coupled to one or more power management integrated circuits 210-1 ... 210-M (PMICs), with "M" representing a positive integer. Each power management integrated circuit 210 (PMIC 210) can regulate a voltage level for a circuitry portion (not shown), such as a whole IC chip or a core or other part of a given IC chip. Each PMIC 210 is coupled to the input-current path 206-11 of the charger 126-1 via the system voltage node 220, which corresponds to, or is held at, the system voltage 208. "Excess" current that is not consumed by a PMIC 210 to provide contemporaneous device functioning is routed to the charging-current path 206-12 as the charging current 202-12. At least a portion of the charging current 202-12 is provided to the power storage unit 122 (PSU 122) via a charge voltage node 222 corresponding to or held at a charge voltage 216.

With these connections, paths, and components, the charging controller 128 can have access to at least an indication representative of the input current 202-11 or the charging current 202-12 (or both). The charging controller 128 can therefore control charging parameters based on the input current 202-11 or the charging current 202-12 (including based on both). For example, the charging controller 128 can control a magnitude of the input current 202-11 or a magnitude of the charging current 202-12 to provide stability to either or both or to maintain either or both within a target current range. A stable or limited input current 202-11 can protect the power source adapter 124 that is providing input current. A stable charging current 202-12, or one that remains within a target range, can provide one or more charging features. These features can include efficient charging of the power storage unit 122, protection of the power storage unit 122 from contemporaneous damage, or protection from long-term battery degradation due to improper or repeated charging cycles. Examples of control processes that can be implemented by the charging controller 128 are described below with reference to FIGS. 5-1 and 5-2.

FIG. 2-2 illustrates, at 200-2 generally, an example multiple charger architecture that is distributed across multiple printed circuit boards (PCBs). The architecture is depicted as having at least two chargers of multiple chargers 126-1 ... 126-N: a first charger 126-1 and a second charger 126-2. As shown, the first charger 126-1 includes a first current path 206-1 and a first current sensor 204-1. A first current 202-1 is flowing through the first current path 206-1. Similarly, the second charger 126-2 includes a second current path 206-2 and a second current sensor 204-2. A second current 202-2 is flowing through the second current path 206-2. FIG. 2-2 also includes the power source adapter 124, the charging controller 128, and a PMIC 210.

In example implementations, the electronic device 102 (of FIG. 1) may include multiple printed circuit boards, such as a first printed circuit board 224-1 (PCB 224-1) and a second printed circuit board 224-2 (PCB 224-2). Although two PCBs are explicitly shown, a given electronic device 102 may include more or fewer PCBs. Each PCB 224 may be rigid, flexible, semi-flexible or rigid-flex, and so forth. Each PCB 224 may also include one or more layers.

The multiple chargers 126-1 ... 126-N may be fabricated on a single PCB 224 for manufacturing simplicity or space savings. Spatial proximity of the different chargers may, however, make heat dissipation more difficult. To facilitate heat dissipation by increasing spatial separation or volumetric distribution of multiple chargers, at least one charger 126 may be on a different PCB 224 as compared to that of other chargers. In the illustrated example, the first printed circuit board 224-1 includes or supports the first charger 126-1, and the second printed circuit board 224-2 includes or supports the second charger 126-2. This may enable the second charger 126-2 to be disposed farther from the first charger 126-2 within a housing of an electronic device to improve thermal performance of the device.

As shown in FIG. 2-2, the PMIC 210 is disposed on the first PCB 224-1 with the first charger 126-1. The power source adapter 124 and the charging controller 128 are shown separate from both the first PCB 224-1 and the second PCB 224-2. These depictions are, however, presented by way of example only. In an alternative implementation, the power source adapter 124 is disposed on the first PCB 224-1, and the PMIC 210 and the charging controller 128 are disposed on the second PCB 224-2. In yet another alternative, the first PCB 224-1 (e.g., a USB adapter board) includes the first charger 126-1, the power source adapter 124, the charging controller 128, and the PMIC 210 to operate as a "main" charging structure. In this alternative, the second PCB 224-2 includes the second charger 126-2 to operate as a "subsidiary" or "secondary" charger that may be installed in an electronic device at some distance from the first PCB 224-1 to facilitate heat dissipation during a charging procedure.

Thus, the charging controller 128 can be located on the first PCB 224-1, on the second PCB 224-2, or elsewhere (e.g., another PCB). In other words, the charging controller 128 can be separate from the first charger 126-1 and separate from the second charger 126-2, can be integrated with the first charger 126-1 and separate from the second charger 126-2, or can be manufactured in a different arrangement. In this context, the charging controller 128 can be "integrated" with a given charger 126 by being manufactured on a same PCB 224, by being packaged together, by being included in a same module, by being fabricated in a same IC, and so forth.

In any of these cases, the charging controller 128 can control a joint or parallel charging procedure of the charging system. To enable this multi-charger control, the charging controller 128 is provided information about at least one current flowing in each charger 126 of at least a portion of the multiple chargers 126-1 ... 126-N. In other words, the charging controller 128 can be coupled to the current path 206 in each charger 126 to obtain access to the corresponding current 202 flowing through the respective current path 206. This is depicted in FIG. 2-2 by arrows 226-1 and 226-2 that represent access by the charging controller 128 to information about the current 202 flowing along the first current path 206-1 and flowing along the second current path 206-2, respectively.

Figures 1, 3:
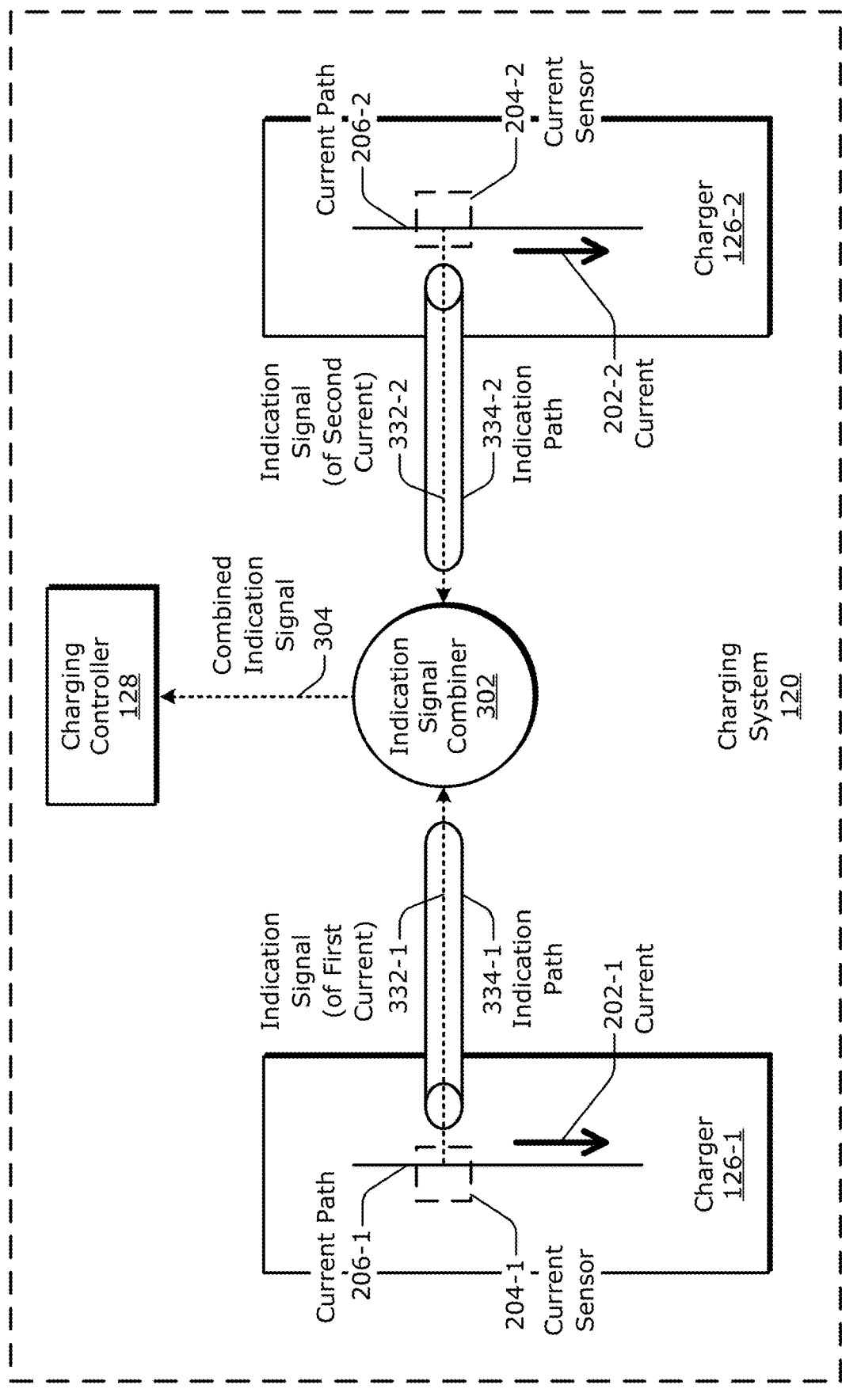
Figures 2, 3:
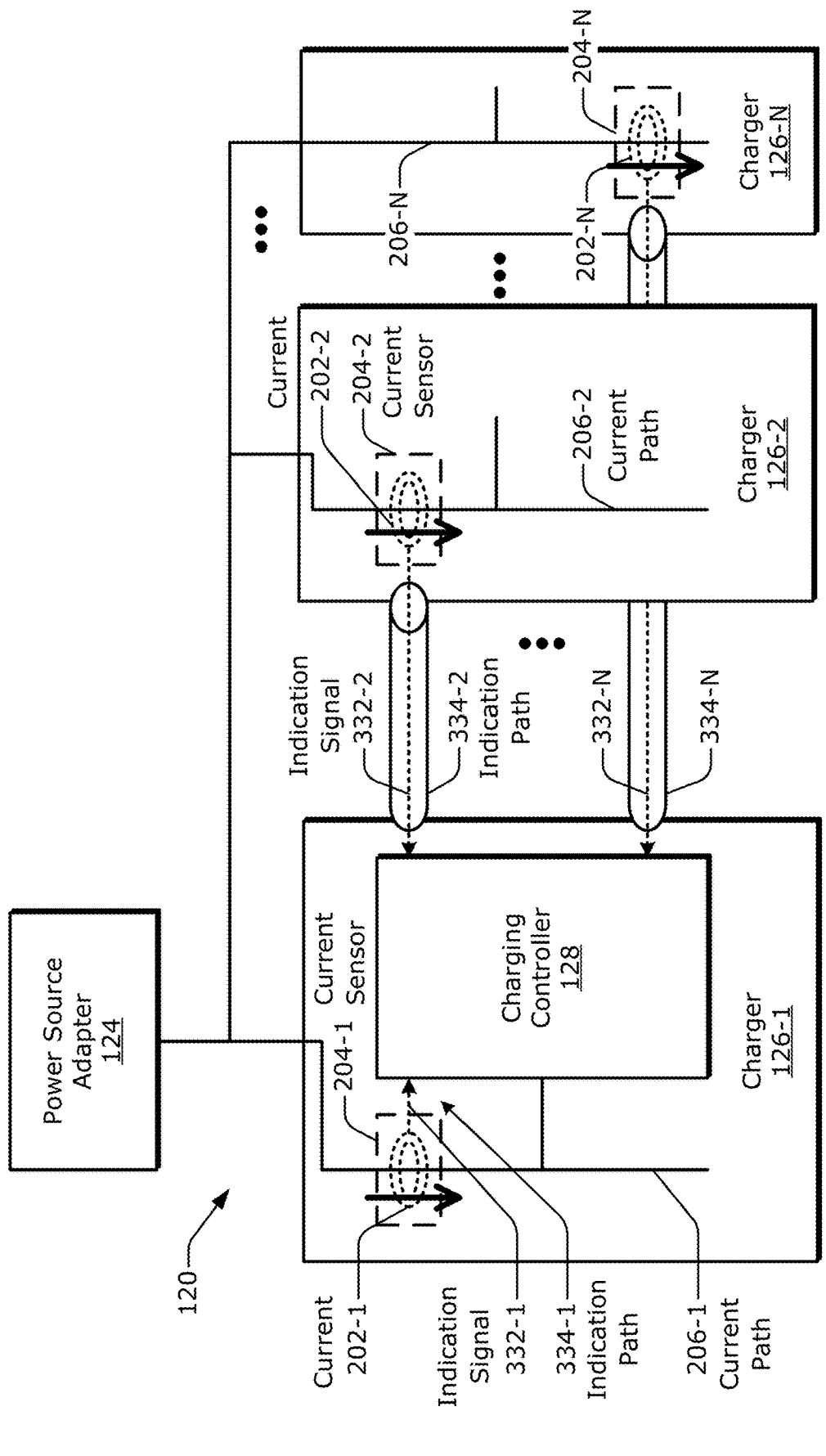

FIG. 3-1 is a schematic diagram 300-1 illustrating an example charging system 120 with multiple chargers 126-1 ... 126-N (here, N=2), an indication signal combiner 302, and a charging controller 128. The multiple chargers 126-1 and 126-2 can charge at least one power storage unit 122 (e.g., of FIGS. 1 and 2-1). With reference also to FIG. 2-2, the access to current information, which is provided to the charging controller 128 as represented by the arrows 226-1 and 226-2, can be realized with at least one indication path 334. The indication path 334 may carry at least one indication signal 332. In certain aspects, multiple indication signals are combined using at least one indication signal combiner 302, as is described below.

In example implementations, the charging system 120 includes a first charger 126-1 having a first current path 206-1 and a second charger 126-2 having a second current path 206-2. The charging system 120 also includes a charging controller 128 and an indication path 334 coupled between the second current path 206-2 and the charging controller 128. The charging controller 128 can also be coupled to the first current path 206-1. These couplings can enable the charging controller 128 to control charging based on multiple currents or a combined current. In some cases, the indication path 334 is realized as a second indication path 334-2 for the second charger 126-2. In such cases, the charging system 120 can also include a first indication path 334-1 that couples the charging controller 128 to the first current path 206-1 of the first charger 126-1.

In other example implementations, the charging system 120 further includes an indication signal combiner 302. The indication signal combiner 302 is coupled between the first indication path 334-1 and the charger controller 128. The indication signal combiner 302 is also coupled between the second indication path 334-2 and the charger controller 128.

In example operations, the indication signal combiner 302 can accept an indication signal 332-1 (e.g., a first indication signal 332-1) of a current 202-1 (e.g., a first current 202-1) flowing through the first current path 206-1. The indication signal combiner 302 can also accept another indication signal 332-2 (e.g., a second indication signal 332-2) of a current 202-2 (e.g., a second current 202-2) flowing through the second current path 206-2. To produce a combined indication signal 304, the indication signal combiner 302 combines the indication signal 332-1 of the current 202-1 flowing through the first current path 206-1 and the indication signal 332-2 of the current 202-2 flowing through the second current path 206-2. The indication signal combiner 302 can further provide the combined indication signal 304 to the charging controller 128.

The charging controller 128 can therefore have access to the first current 202-1 and the second current 202-2 individually, or jointly in the form of the combined indication signal 304. Here, the combined indication signal 304 is responsive to a magnitude of the current 202-1 flowing through the first current path 206-1 and a magnitude of the current 202-2 flowing through the second current path 206-2. This access to current information can be provided using, for instance, a first current sensor 204-1 of the first charger 126-1 and a second current sensor 204-2 of the second charger 126-2. The current information access enables the charging controller 128 to control the charging system 120 at least partly across multiple chargers, including at least partly across multiple parallel chargers.

With access to information on flowing currents that corresponds to the first and second chargers 126-1 and 126-2, the charging controller 128 can control operation of at least the first charger 126-1 based on the current 202-1 flowing through the first current path 206-1 and the current 202-2 flowing through the second current path 206-2. For example, the charging controller 128 can control at least one switching parameter of the first charger 126-1 based on the combined indication signal 304. The switching parameter can include a switching frequency, a switching rate, a switching duty cycle, some combination thereof, and so forth. The switching parameter can be applied to operation of one or more switches of, e.g., a switched-mode power supply (SMPS) implementation of the first charger 126-1. This is described further with reference to FIGS. 5-1, 5-2, 6-1, and 6-2.

In the illustrated example of FIG. 3-1, the variable "N" for the multiple chargers 126-1 ... 126-N corresponds to two (2). Nonetheless, the described principles are applicable to parallel charging architectures with more than two chargers. With a charging system 120 that includes at least three chargers, the charging system 120 can additionally include a third charger having a third current path (not explicitly shown in FIG. 3-1). The charging system 120 further includes a third indication path (not shown) coupled between the third current path and the indication signal combiner 302. This indication signal combiner 302 therefore also accepts an indication signal of a current flowing through the third current path. With three indication signals, the indication signal combiner 302 can combine the indication signal 332-1 of the current 202-1 flowing through the first current path 206-1, the indication signal 332-2 of the current 202-2 flowing through the second current path 206-2, and the indication signal of the current flowing through the third current path of the third charger to produce the combined indication signal. More than two chargers, such as a third or an "Nth" charger 126-N, are depicted in FIG. 3-2 and described next.

Figures 1, 6:
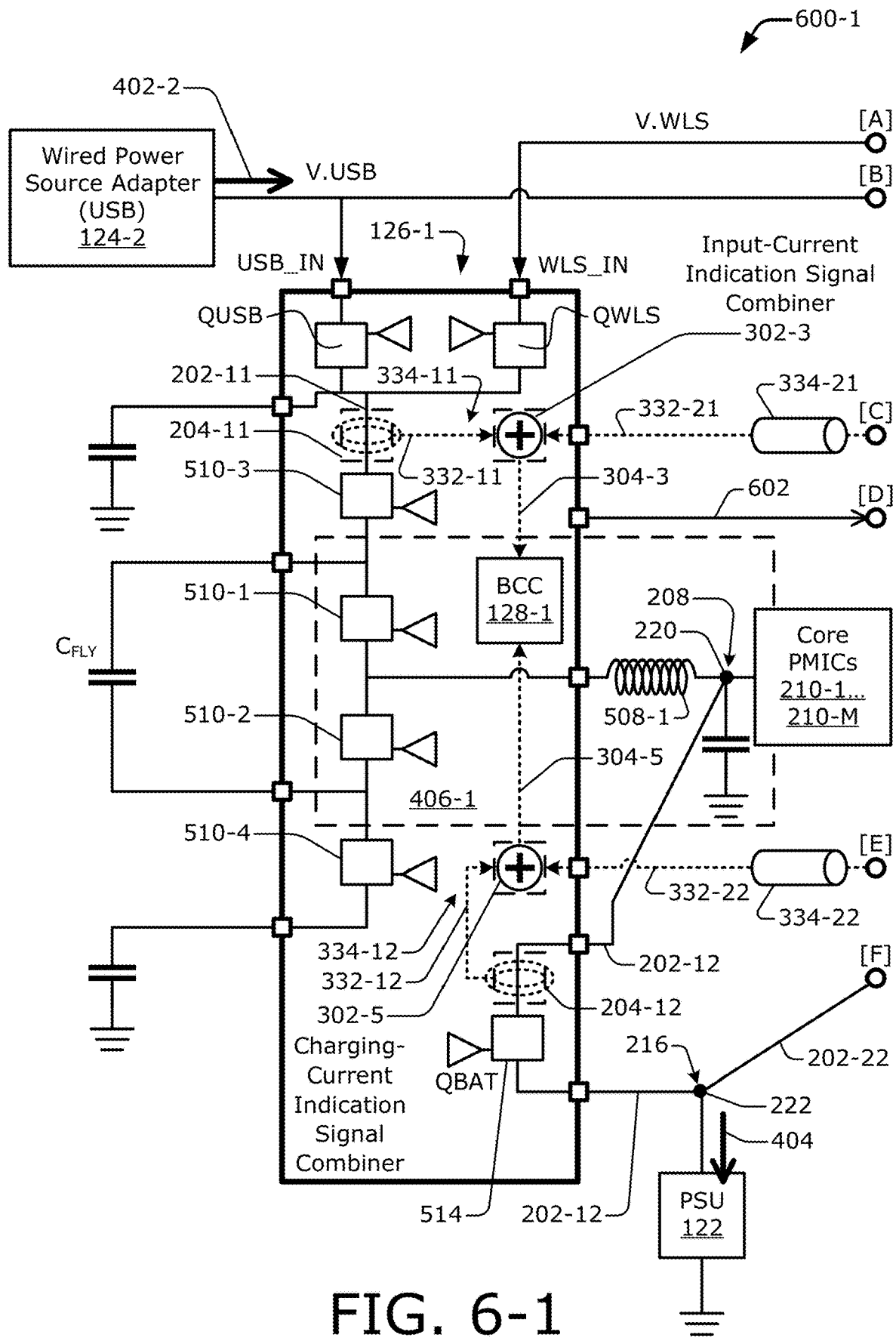
Figures 2, 6:
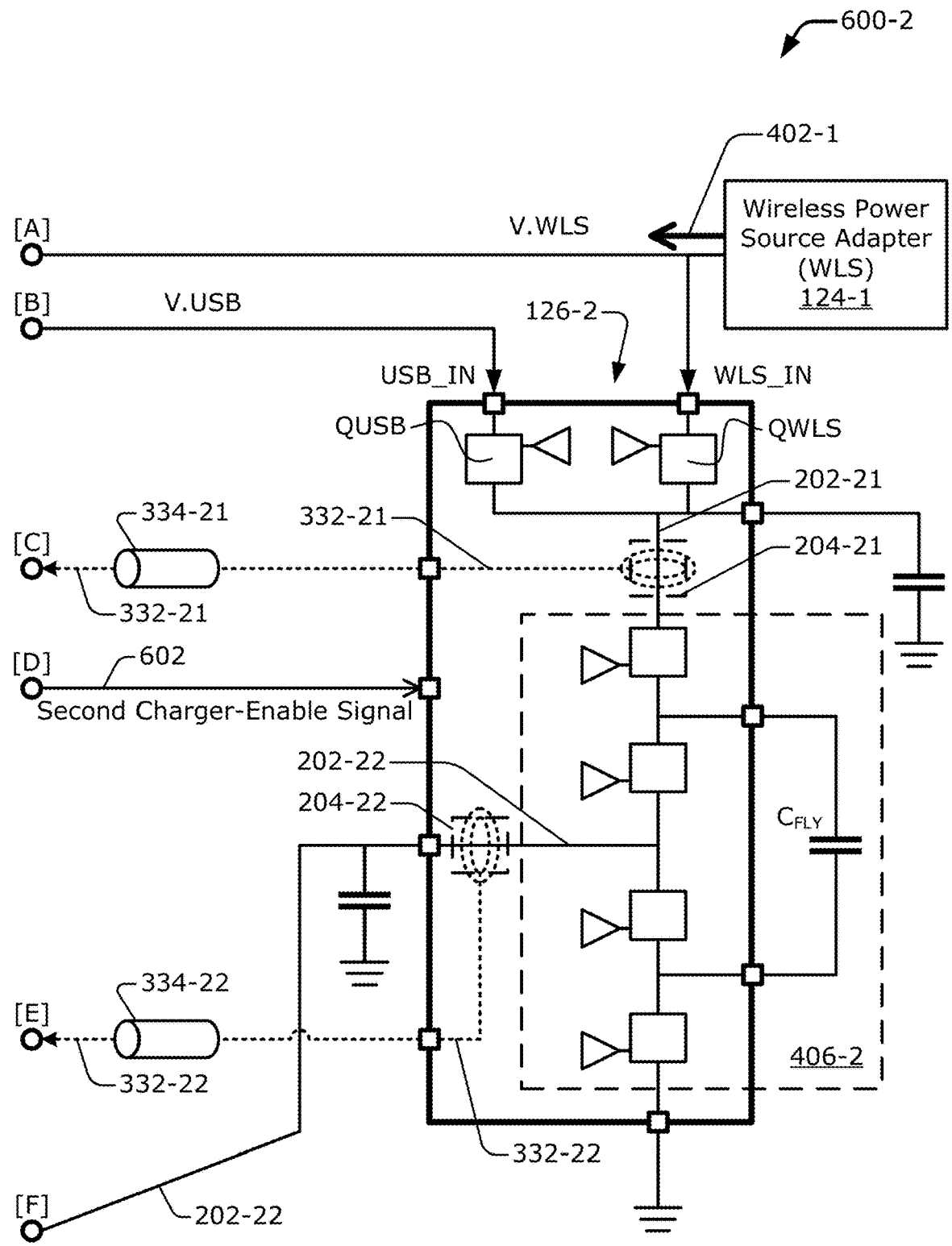

FIG. 3-2 is a schematic diagram 300-2 illustrating an example charging system 120 with multiple chargers 126-1, 126-2, ..., 126-N that are coupled together in a parallel charging architecture providing at least one indication signal 332 of a current 202 flowing through a charger 126. Thus, in some implementations, at least two different chargers of the multiple chargers 126-1 ... 126-N can obtain a respective current 202 from the power source adapter 124 "directly," meaning without having the respective current 202 routed through another charger 126 of the multiple chargers 126-1 ... 126-N. As illustrated, the power source adapter 124 is coupled to each charger 126 of the multiple chargers 126-1 ... 126-N. Although only a single power source adapter 124 is shown in FIG. 3, each charger 126 can be coupled to multiple power source adapters as shown in FIG. 2-1 for the charger 126-1 and as shown in FIGS. 6-1 and 6-2 for the first and second chargers 126-1 and 126-2.

Each respective charger 126 has at least one respective current path 206. For example, the first charger 126-1 includes a first current path 206-1, the second charger 126-2 includes a second current path 206-2, and the "Nth" charger 126-N includes an "Nth" current path 206-N. Each current path 206 of FIG. 3-2 can correspond to an input-current path (e.g., the input-current path 206-11 of FIG. 2-1) or a charging-current path (e.g., the charging-current path 206-12 of FIG. 2-1). In some cases, the power source adapter 124 is coupled to each respective charger 126 via an input-current path implementation of a respective current path 206 so that the power source adapter 124 can provide an input current to the respective charger 126.

In example implementations, each respective current path 206 of each respective charger 126 has a respective current 202 flowing through the current path during operation. Further, each respective charger 126 includes a respective current sensor 204 that can sense the current 202 that is flowing through the respective current path 206. Thus, the first charger 126-1 includes a first current sensor 204-1, the second charger 126-2 includes a second current sensor 204-2, and the "Nth" charger 126-N includes an "Nth" current sensor 204-N. The first current sensor 204-1 senses the first current 202-1 flowing through the first current path 206-1. The second current sensor 204-2 senses the second current 202-2 flowing through the second current path 206-2. The "Nth" current sensor 204-N senses the "Nth" current 202-N flowing through the "Nth" current path 206-N.

The charging controller 128 can be separate from each charger 126, can be partially part of at least one charger 126 (e.g., the first charger 126-1), or can be solely associated or integrated with a single charger 126. In some environments, the charging controller 128 is integrated with regulation circuitry for a given charger 126, such as the first charger 126-1. The charging controller 128 may therefore lack "direct" access to currents flowing in one or more other chargers. In operation of the first charger 126-1, the first current sensor 204-1 provides to the charging controller 128 a first indication signal 332-1 of the first current 202-1 flowing through the first current path 206-1. The first indication signal 332-1 may be coupled from the first current sensor 204-1 to the charging controller 128 via the first indication path 334-1. A graphical depiction of the first indication path 334-1 is omitted from FIG. 3-2 for clarity, but a graphical depiction of the first indication path 334-1 is illustrated in, e.g., FIG. 3-1.

By implementing the illustrated parallel charging architecture, a combined current provided by the power source adapter 124 is divided, equally or unequally, across multiple chargers 126-1 . . . 126-N and multiple current paths 206-1 . . . 206-N respectively thereof. Example combined currents, such as a combined input current and a combined charging current, are described below with reference to FIG. 4. By splitting the combined current with the parallel charging architecture, the power is dissipated in different components of the multiple chargers 126-1 . . . 126-N with lower magnitudes of current therefore contributing to the current-squared term ($i^2$) of the power dissipation relationship presented above. The combined current supplied by the power source adapter 124 may not, however, flow through a single charger. Consequently, it can be challenging for the charging controller 128 to determine a combined contemporaneous current draw across the charging system 120, absent application of the techniques described herein. If, for instance, the charging controller 128 is part of a controller for a regulator of the first charger 126-1, the charging controller 128 may not have access to a single current path that contains the combined current provided by the power source adapter 124.

To accommodate this situation, any or all of the other chargers (e.g., the chargers 126-2 . . . 126-N) can provide at least one respective indication signal 332 of a current 202 flowing through a respective current path 206 within a respective charger 126. As shown, a respective indication path 334 extends between, or couples, a respective charger 126 to the charging controller 128. Each indication path 334 can be realized as, for example, a wire, a cable or part thereof, a metallic trace on a PCB, or another conductive path, depending on implementation and whether different chargers are disposed on a same or different IC chips, modules, and/or boards. Thus, each respective current sensor 204 can provide to the charging controller 128 a respective indication signal 332 of a respective current 202 via the respective indication path 334 for each respective charger 126.

Specifically, the second current sensor 204-2 provides, to the charging controller 128 via a second indication path 334-2, a second indication signal 332-2 of the second current 202-2 flowing through the second current path 206-2 of the second charger 126-2. Similarly, the "Nth" current sensor 204-N provides, to the charging controller 128 via an "Nth" indication path 334-N, an "Nth" indication signal 332-N of the "Nth" current 202-N flowing through the "Nth" current path 206-N of the "Nth" charger 126-N. Although not as explicitly depicted in FIG. 3-2 for clarity, the first charger 126-1 may include a first indication path 334-1 for carrying or propagating the first indication signal 332-1 between the first current sensor 204-1 and the charging controller 128. Further, although also not shown in FIG. 3-2, at least one indication signal combiner 302 (e.g., of FIG. 3-1) can be disposed between the multiple indication paths and the charging controller 128 to combine the multiple indication signals to produce a combined indication signal 304 (e.g., of FIG. 3-1). The indication signal combiner 302 may be separate from or part of the charging controller 128.

The one or more indication paths 334 therefore enable the charging controller 128 to control a combined current in the charging system 120 while multiple chargers provide charging functionality in parallel or at least substantially simultaneously. Additionally, one or more of the multiple chargers 126-1 . . . 126-N can be spatially separated from each other within a housing of an electronic device 102, which can further facilitate thermal management. In these manners, the charging controller 128 can make current flow decisions, or charging regulation decisions, based on multiple currents or at least one combined current in the charging system 120 using one or more of the multiple indication signals 332-2 . . . 332-N in addition to the indication signal 332-1.

Figure 4:
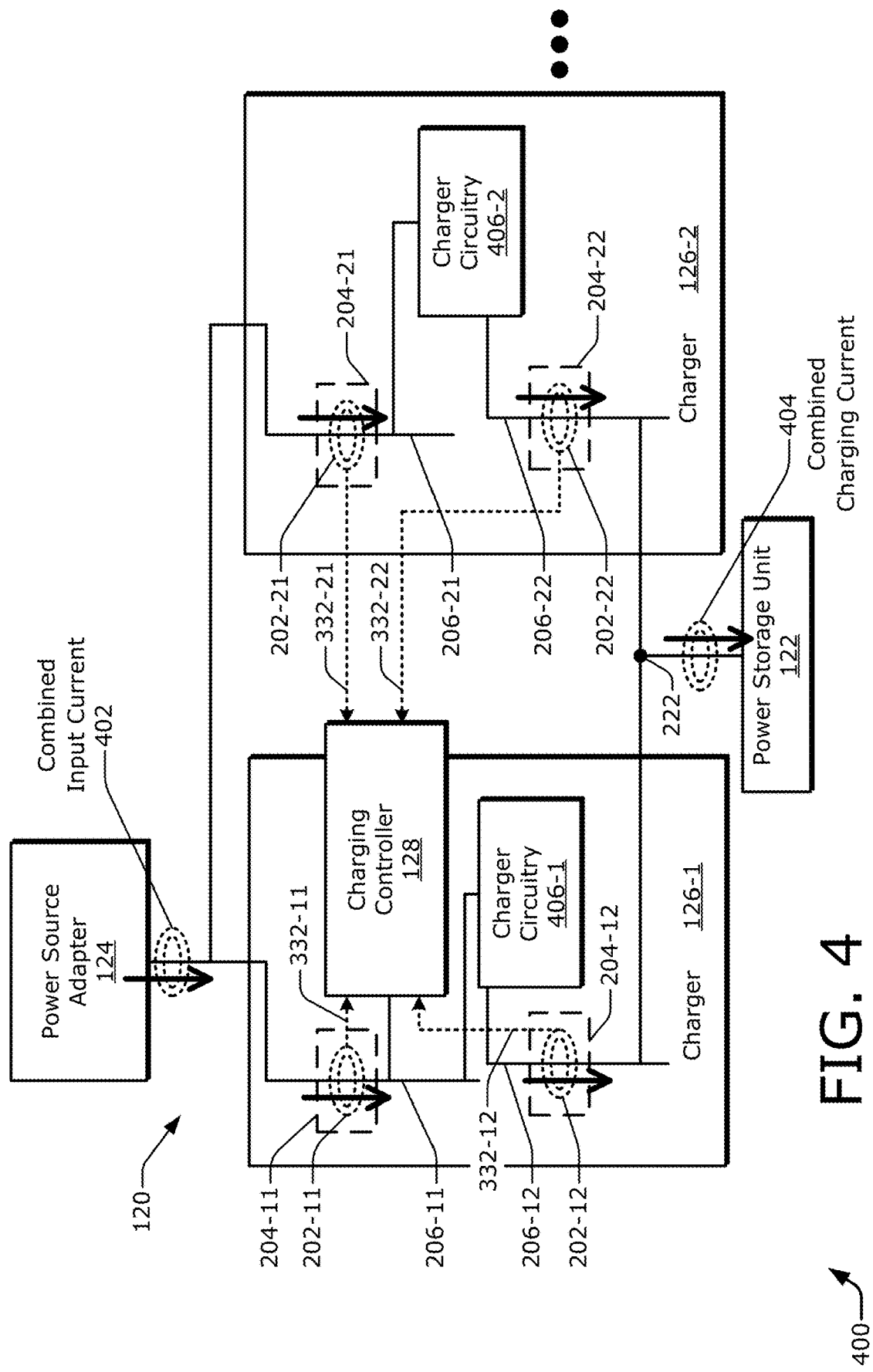
FIG. 4 is a schematic diagram illustrating an example charging system with first and second chargers in which multiple indication signals include an indication signal of an input current and an indication signal of a charging current.

FIG. 2-1 is described above to illustrate example concepts of regulating multiple types of current, such as input current and charging current, that flow through at least one charger. FIGS. 3-1 and 3-2 are described above to illustrate example concepts of regulating at least one type of current flowing through multiple chargers in a parallel charging architecture. FIG. 4 is described next to illustrate example concepts of both—e.g., regulating multiple types of current flowing through each of multiple chargers in a parallel charging architecture.

FIG. 4 is a schematic diagram 400 illustrating an example charging system 120 with first and second chargers 126-1 and 126-2 in which multiple indication signals include at least one indication signal of at least one input current and at least one indication signal of at least one charging current. In example implementations, the power source adapter 124 is coupled to the first charger 126-1 at a first input-current path 206-11 and is coupled to the second charger 126-2 at a second input-current path 206-21. The power source adapter 124 provides a combined input current 402 that is distributed across the multiple chargers 126-1 . . . 126-N, or across the first and second chargers 126-1 and 126-2 in this example where N=2. Thus, a sum of a first input current 202-11 flowing through the first input-current path 206-11 and a second input current 202-21 flowing through the second input-current path 206-21 can be substantially equal to the combined input current 402.

The charging system 120 provides a combined charging current 404 to the power storage unit 122 based on individual charging currents provided by individual ones of the multiple chargers 126-1 . . . 126-N, or from the first and second chargers 126-1 and 126-2 here. The first charger 126-1 provides a first charging current 202-12 that is flowing through a first charging path 206-12. The second charger 126-2 provides a second charging current 202-22 that is flowing through a second charging path 206-22. Thus, a sum of the first charging current 202-12 flowing through the first charging-current path 206-12 and the second charging current 202-22 flowing through the second charging-current path 206-22 can be substantially equal to the combined charging current 404.

In certain implementations, each respective charger 126 includes respective charger circuitry 406. The charger circuitry 406 provides charging functionality or control for a respective charger 126. Examples of charger circuitry include a switched-mode power supply (SMPS) (e.g., a buck or booster regulator), a charge pump, and so forth. The first charger 126-1 includes first charger circuitry 406-1, and the second charger 126-2 includes second charger circuitry 406-2. The first charger circuitry 406-1 can be coupled between the first input-current path 206-11 and the first charging-current path 206-12. The second charger circuitry 406-2 can be coupled between the second input-current path 206-21 and the second charging-current path 206-22. Although depicted separately, the charging controller 128 and the first charger circuitry 406-1 can be implemented or integrated partially or fully together. If implemented at least partially together, regulation of the first charger 126-1 can also regulate the combined input current 402 or the combined charging current 404 by regulating an individual portion thereof, as described herein. Further, by interpreting the "or" as an inclusive disjunction as explained hereinbelow, the first charger 126-1 can regulate both the combined input current 402 and the combined charging current 404 using the charging controller 128 and the charger circuitry 406-1.

To obtain representations of various current magnitudes, each charger 126 can include at least one current sensor 204. In the illustrated example, the first charger 126-1 includes a first input-current sensor 204-11 that senses the first input current 202-11 flowing through the first input-current path 206-11. The first charger 126-1 also includes a first charging-current sensor 204-12 that senses the first charging current 202-12 flowing through the first charging-current path 206-12. The second charger 126-2 includes a second input-current sensor 204-21 that senses the second input current 202-21 flowing through the second input-current path 206-21. The second charger 126-2 also includes a second charging-current sensor 204-22 that senses the second charging current 202-22 flowing through the second charging-current path 206-22.

The first input-current sensor 204-11 provides to the charging controller 128 a first input-current indication signal 332-11 that indicates (e.g., represents or communicates) a magnitude of the first input current 202-11. The indication can be absolute or relative, such as by using current scaling. The first charging-current sensor 204-12 provides to the charging controller 128 a first charging-current indication signal 332-12 that indicates a magnitude of the first charging current 202-12. The second input-current sensor 204-21 provides to the charging controller 128 a second input-current indication signal 332-21 that indicates a magnitude of the second input current 202-21. The second charging-current sensor 204-22 provides to the charging controller 128 a second charging-current indication signal 332-22 that indicates a magnitude of the second charging current 202-22. Although not shown in FIG. 4, each respective indication signal 332 can be propagated using a respective indication path 334 (e.g., of FIGS. 3-1, 3-2, 6-1, and 6-2).

With a two-charger implementation that operates based on input and charging currents, the charging controller 128 accepts or otherwise obtains four indication signals 332-11, 332-12, 332-21, and 332-22 or at least one combined signal derived therefrom. The charging controller 128 can regulate the combined input current 402 based on the indication signal 332-11 of the first input current 202-11 or the indication signal 332-21 of the second input current 202-21 (including based on both). For example, if a magnitude of the second input current 202-21 increases by "x" milliamps (mA), the charging controller 128 can cause the first charger circuitry 406-1 to decrease an amount or magnitude of the first input current 202-11 by "x" mA to maintain a substantially-constant combined input current 402 or to maintain a combined input current 402 within a target input-current range. Similarly, the charging controller 128 can regulate the combined charging current 404 based on the indication signal 332-12 of the first charging current 202-12 or the indication signal 332-22 of the second charging current 202-22 (including based on both). These regulation procedures can expand or scale as additional chargers are included in a parallel charging architecture.

Figures 1, 5:
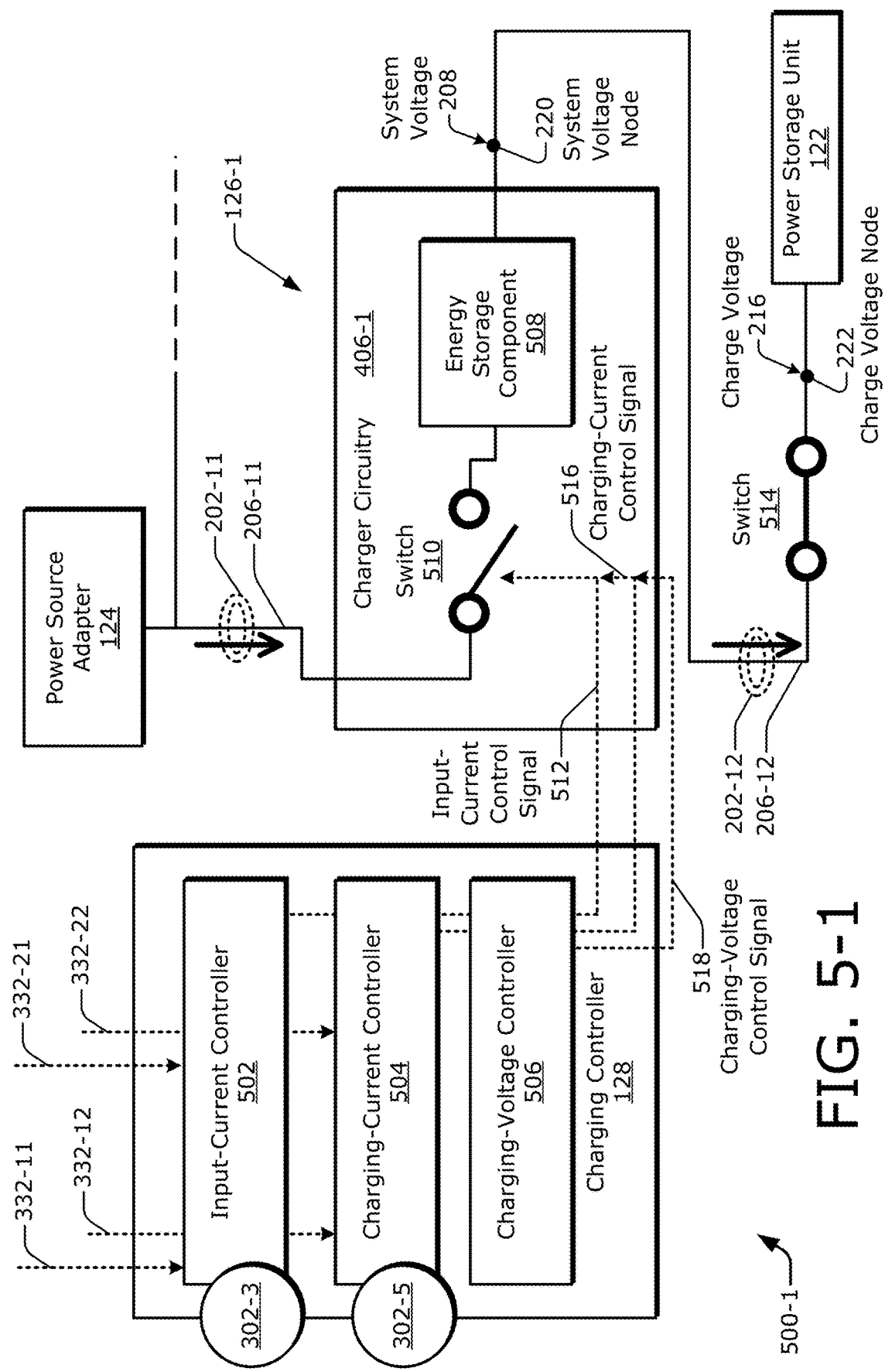
Figures 2, 5:
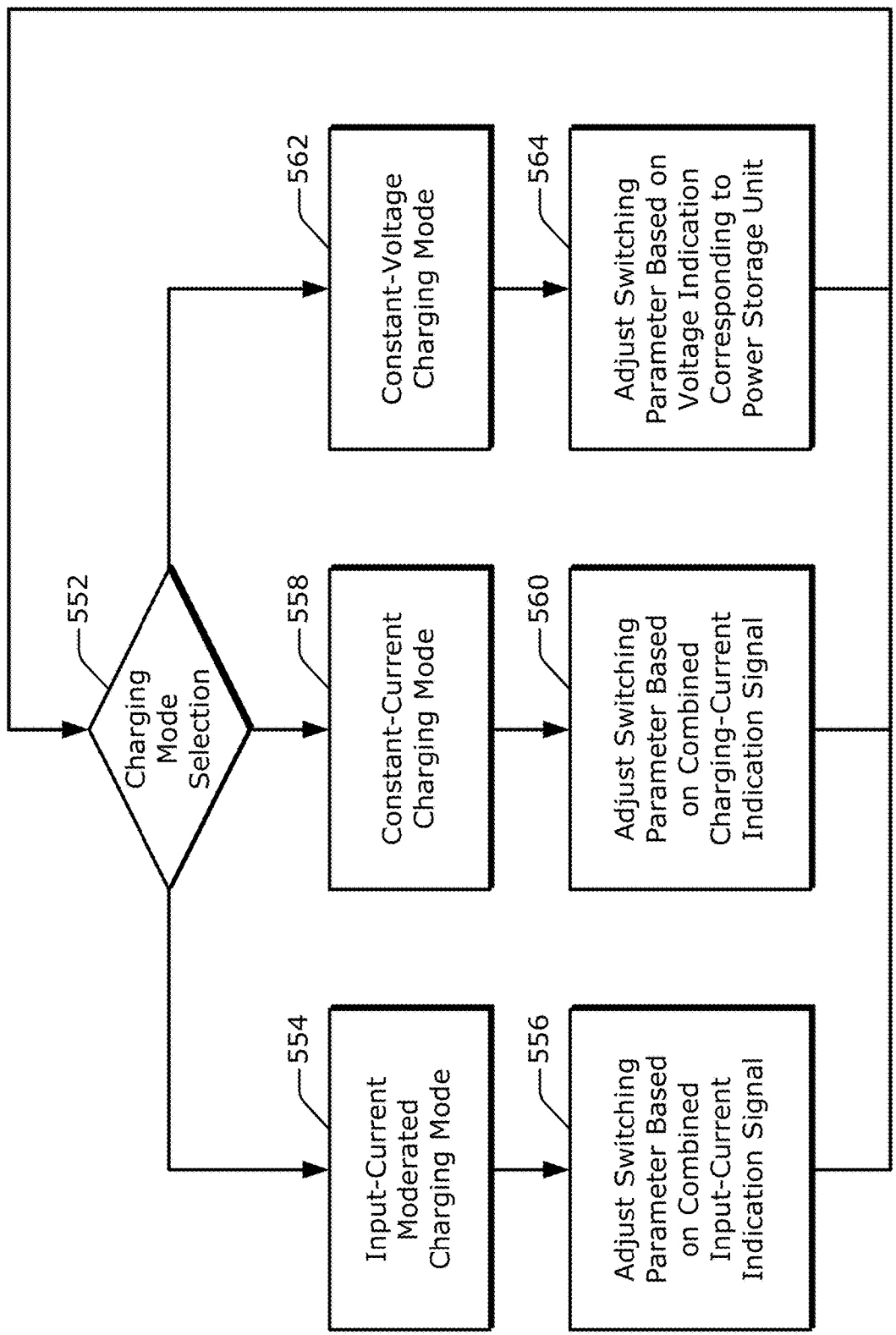

FIG. 5-1 is a schematic diagram 500-1 illustrating an example of a charging controller 128 and charger circuitry 406-1. By way of example only, the charging controller 128 is coupled to the first charger circuitry 406-1 of the first charger 126-1 (e.g., also of FIG. 4). The power source adapter 124 is coupled to the first charger circuitry 406-1 via the first input-current path 206-11, which propagates the first input current 202-11 from the power source adapter 124.

In this example, the first charger circuitry 406-1 is implemented as an SMPS. The first charger circuitry 406-1 includes at least one switch 510 and at least one energy storage component 508, such as a capacitor or an inductor. The switch 510 can be realized using at least one transistor, such as a field-effect transistor (FET) or a bipolar junction transistor (BJT). The energy storage component 508 is coupled to the system voltage node 220 to provide the system voltage 208 to at least one PMIC 210 (e.g., of FIGS. 2-1 and 6-1) or to the charge voltage node 222 via at least one switch 514. The switch 514, which is described further below, is closed during charging and can form at least part of a current-sensing component to sense the first charging current 202-12.

In operation, the at least one switch 510 is closed and opened to provide regulation of the power delivery via enabling and disabling, respectively, a flow of the first input current 202-11 through the switch 510 and to the energy storage component 508. Thus, the charging controller 128 can control whether the switch 510 is in a closed state to permit input-current flow or in an open state to prevent the flow of the first input current 202-11. To do so, the charging controller 128 may use, for instance, an input-current control signal 512 to control the open/closed state of the switch 510 based on the first input current 202-11. The first charger circuitry 406-1 may, however, be implemented using alternative or additional power regulation circuitry. Other example implementations are described below that include two or four switches to respectively realize a two-level or a three-level buck charger or voltage regulator. Generally, the at least one switch 510 is operated (e.g., opened or closed) in accordance with at least one switching parameter. The at least one switching parameter can relate to a switching frequency, a switching rate, a switching duty cycle, a combination thereof, and so forth. Examples are described below in terms of a switching duty cycle.

A flow of current from the first charger 126-1 to the power storage unit 122 is also depicted in FIG. 5-1. In this example, the first charging-current path 206-12 includes the at least one switch 514. During a charging operation, the switch 514 is closed and can be used to sense a flow of the first charging current 202-12 flowing through the switch 514 and thus to the power storage unit 122. The power storage unit 122 has an input charging voltage corresponding to the charge voltage 216 at the charge voltage node 222.

To control charging-current flow, the charging controller 128 can use a control signal 512, 516, or 518 to establish an open state or a closed state of the switch 510 in accordance with a duty cycle. In this manner, the charging controller 128 can control an amount or magnitude of a portion of the combined charging current 404 (e.g., of FIG. 4) that is being applied to the power storage unit 122 by the first charger 126-1 via the charge voltage node 222. In effect, the charging controller 128 controls the combined charging current 404 by controlling an amount of the first input current 202-11 that flows to the system voltage node 220 and then to the switch 514 and the charge voltage node 222. To perform this charging-current control, the charging controller 128 can permit or block input-current flow through the energy storage component 508 by controlling the switch 510 of the first charger circuitry 406-1 using the control signal 512, 516, or 518, which are described below.

In example implementations, the charging controller 128 can include one or more different or individual controllers to realize different or individual control loops. Examples of such control loops are described further below with reference to FIG. 5-2. Examples of these included controllers are an input-current controller 502, a charging-current controller 504, and a charging-voltage controller 506. In some cases, multiple ones of these control loops can function in parallel—e.g., substantially simultaneously or at least partially overlapping. If so, whichever loop detects that a limit has been reached (e.g., a maximum input current threshold, a charging current threshold range, or a charging voltage threshold), that loop activates to control the switch 510. In other words, if a controller 502, 504, or 506 determines that a monitored threshold is reached or is about to be breached, that controller can change the duty cycle for the switching of the at least one switch 510. With respect to a charging voltage threshold, the charging-voltage controller 506 can monitor and regulate the charge voltage 216 at the charge voltage node 222. To achieve a substantially-constant charging voltage or to maintain the charging voltage within some target voltage range for the power storage unit 122, the charging-voltage controller 506 can control the switch 510 using the charging-voltage control signal 518 based on a detected charge voltage 216.

For current-based control loops, the input-current controller 502 or the charging-current controller 504 can be operational. The input-current controller 502 can be coupled to or associated with an input-current indication signal combiner 302-3, and the charging-current controller 504 can be coupled to or associated with a charging-current indication signal combiner 302-5. The input-current controller 502 can obtain the first input-current indication signal 332-11 and the second input-current indication signal 332-21 (e.g., both also of FIGS. 4, 6-1, and 6-2). These two signals may also or instead be obtained as a combined input-current indication signal (e.g., as shown in FIG. 6-1) via the input-current indication signal combiner 302-3. Analogously, the charging-current controller 504 can obtain the first charging-current indication signal 332-12 and the second charging-current indication signal 332-22 (e.g., both also of FIGS. 4, 6-1, and 6-2). These two signals may also or instead be obtained as a combined charging-current indication signal (e.g., as shown in FIG. 6-1) via the charging-current indication signal combiner 302-5. Each indication signal 332 can be realized as a current-based signal or as a voltage-based signal.

In some implementations for regulating the combined input current 402 (e.g., of FIG. 4), the input-current controller 502 accepts the first input-current indication signal 332-11 and the second input-current indication signal 332-21. The input-current controller 502 regulates the combined input current 402 based on the first input-current indication signal 332-11 and the second input-current indication signal 332-21. This regulation can therefore be based on a combination of these indication signals as provided by the input-current indication signal combiner 302-3. The input-current controller 502 can generate the input-current control signal 512 based on the first input-current indication signal 332-11 and the second input-current indication signal 332-21 and on at least one input-current threshold. The input-current controller 502 applies the input-current control signal 512 to the switch 510 to control whether the switch 510 is in the closed state to permit current to flow or in the open state to prevent current from flowing.

For example, if the second input-current indication signal 332-21 is indicative of an increase in a draw of the second input current 202-21 by the second charger 126-2 (e.g., of FIG. 4), the input-current controller 502 is to decrease a flow of the first input current 202-11 if the increased combined current would otherwise exceed a maximum input current threshold. To do so, the input-current controller 502 can decrease an amount of time the switch 510 is in the closed state each switching cycle using the input-current control signal 512. In these manners, the input-current controller 502 can prevent the combined input current 402 from exceeding a maximum permitted current draw from the power source adapter 124 or maintain the combined input current 402 within a target input-current range (e.g., maintain between two input current thresholds).

In some implementations for regulating the combined charging current 404 (e.g., of FIG. 4), the charging-current controller 504 accepts the first charging-current indication signal 332-12 and the second charging-current indication signal 332-22. The charging-current controller 504 regulates the combined charging current 404 based on the first charging-current indication signal 332-12 and the second charging-current indication signal 332-22. This regulation can therefore be based on a combination of these indication signals as provided by the charging-current indication signal combiner 302-5. The charging-current controller 504 can generate a charging-current control signal 516 based on the first charging-current indication signal 332-12 and the second charging-current indication signal 332-22 and on at least one charging-current threshold. The charging-current controller 504 applies the charging-current control signal 516 to the switch 510. The charging-current control signal 516 controls whether the switch 510 is in the closed state to permit current to flow or in the open state to prevent current from flowing.

For example, if the second charging-current indication signal 332-22 is indicative of a decrease of the second charging current 202-22 by the second charger 126-2 (e.g., of FIG. 4)—which may be inferred from a combined indication signal, the charging-current controller 504 is to increase a flow of the first charging current 202-12 to maintain a constant-current charging condition. To do so, the charging-current controller 504 can increase a length of time the switch 510 is in the closed state each switching cycle using the charging-current control signal 516. This can increase the first charging current 202-12 by increasing "upstream" a magnitude of the first input current 202-11 that is drawn by the first charger circuitry 406-1 by controlling the switch 510 via the charging-current control signal 516. In these manners, the charging-current controller 504 can maintain a substantially-constant combined charging current 404 or maintain the combined charging current 404 within a target charging-current range, including below a maximum or above a minimum charging current (e.g., as stipulated by a battery-charging algorithm responsive to a detected charge level of the battery).

FIG. 5-2 is a flow chart 500-2 illustrating example control loop types including those that may operate with a charging controller based on a combined indication signal. The flow chart 500-2 is described in the form of a set of blocks 552-564 that specify operations that can be performed. However, operations are not necessarily limited to the order shown in FIG. 5-2 or described herein, for the operations may be implemented in alternative orders or in fully or partially overlapping manners. Also, more, fewer, and/or different operations may be performed to implement one or more control loops. The operations may be implemented at least partially by, for example, a charging system 120 including a charging controller 128.

At block 552, a charging mode is selected. The charging mode can be selected based on at least one sensor input, such as a current sensor or a voltage sensor, a contemporaneous charge state of a battery, combinations thereof, and so forth. Generally, the different charging modes or control loops can provide mechanisms for regulating input current, charging current, charging voltage, combinations thereof, and so forth. In some aspects, the charging controller 128 monitors both combined input current and combined charging current. If a sensed input current or charging current exceeds the corresponding regulation level, the charging controller 128 reduces the SMPS duty cycle. Thus, the control loop that "demands" the lower current (including a lowest current) determines the duty cycle of the SMPS at any given time. With a buck converter, for example, the duty cycle can correspond to the time the high-side switch is (or high-side switches are) closed or turned on, relative to the total switching cycle.

If an input current is too high (e.g., exceeds some safety threshold for a power source adapter 124), the charging system 120 can enter a charging mode to moderate the input current at block 554. Accordingly, at block 556, the charging controller 128 can adjust at least one switching parameter (e.g., that is applied to the at least one switch 510 using the input-current control signal 512) based on a combined input-current indication signal that represents multiple input currents distributed across multiple chargers 126-1 . . . 126-N.

If a voltage on a battery is relatively low, then a constant-current charging mode may be entered at block 558. The constant-current magnitude may be relatively high to accelerate battery recharging. During the constant-current charging mode, the charging controller 128 can monitor a combined charging-current indication signal that represents multiple charging currents distributed across multiple chargers 126-1 . . . 126-N. Based on the combined charging-current indication signal, at block 560 the charging controller 128 can adjust at least one switching parameter (e.g., that is applied to the at least one switch 510 using the charging-current control signal 516) to maintain a substantially constant charging current that is being supplied to the power storage unit 122.

After a battery voltage has climbed to some threshold, then the charging system 120 can enter a constant-voltage charging mode at block 562. In the constant-voltage charging mode, as shown at block 564, the charging controller 128 can adjust at least one switching parameter (e.g., that is applied to the at least one switch 510 using the charging-voltage control signal 518) based on a voltage indication corresponding to the power storage unit 122 (e.g., a detected voltage for the charge voltage node 222). While the voltage is maintained at a substantially constant level, the charging current can be decreased to increase long-term battery health. Although some of these operations are described above in terms of combined indication signals, these modes can instead be implemented using separate indication signals, such as by employing multiple thresholds or multiple comparison operations.

FIGS. 6-1 and 6-2 depict an example charging system 120 (e.g., of FIGS. 2-1, 3-1, 3-2, and 4) with two chargers. FIG. 6-1 is a circuit diagram 600-1 illustrating an example first charger 126-1 that is realized as a "main" charger of the charging system 120. FIG. 6-2 is a circuit diagram 600-2 illustrating an example second charger 126-2 that is realized as a "secondary" charger of the charging system 120 of FIG. 6-1. Thus, FIGS. 6-1 and 6-2 jointly depict different parts of an example charging system 120. Inter-figure connections are indicated with letters [A]-[F]. Some of the components described above and illustrated in FIGS. 1 to 5-2 are implemented using a specific example component in FIGS. 6-1 and 6-2. For example, the switch 514 is implemented using a power FET (QBAT), which can be coupled to or can include a diode, a driver (as represented by a triangle in FIGS. 6-1 and 6-2), and so forth. Further, the energy storage component 508 is implemented as an inductor 508-1. However, the components described above can be implemented with alternative hardware and in alternative manners as compared to those that are depicted in FIGS. 6-1 and 6-2 and described below.

In example implementations, the first charger 126-1 is realized as a buck charger, and the second charger 126-2 is realized as a charge pump charger. However, the first and second chargers 126-1 and 126-2 can be implemented differently. The wired power source adapter 124-2 is implemented as a USB adapter, and the wireless power source adapter 124-1 is realized as a wireless receiver (Rx) with at least one inductive loop (WLS). The USB adapter provides a USB voltage (V.USB) and a second combined input current 402-2. The wireless receiver provides a wireless voltage (V.WLS) and a first combined input current 402-1. Both the first charger 126-1 and the second charger 126-2 include multiple transistors that are realized as power FETs to implement one or more switches. However, other transistor types that are connected or biased differently than as shown may be implemented. Each power FET may include or be paired with a respective diode (not explicitly shown) for current flow management. The flow of input current can be turned on or off using the QUSB or the QWLS transistor (which are examples of the switches 218 in FIG. 2-1) in each of the two chargers 126-1 and 126-2.

The first charger circuitry 406-1 of the first charger 126-1 is implemented as a buck converter that can provide a regulated power supply. At least one switch 510 for regulation is implemented as at least two transistors: a first transistor 510-1 and a second transistor 510-2. With two transistors, a two-level buck converter can be implemented, with the first transistor 510-1 corresponding to the high-side switch that turns on the duty cycle. Alternatively, a three-level buck converter can be implemented with four transistors, which incorporates a third transistor 510-3 and a fourth transistor 510-4. Here, the first transistor 510-1 and the third transistor 510-3 correspond to the high-side switches that turn on the duty cycle portion of the switching cycle. Further, the first charger circuitry 406-1 can include a charge pump that has a flying capacitor $C_{FLY}$. The first charger circuitry 406-1 also includes the energy storage component 508-1, which is realized as at least one inductor here. The inductor is coupled to the system voltage node 220, which is held to the system voltage 208. One or more PMICs, which are implemented as core PMICs 210-1 . . . 210-M here, are also coupled to the system voltage node 220.

The first charger 126-1 includes a switch 514 that is implemented as a power FET (QBAT) with a driver coupled thereto. This power FET is coupled to the charge voltage node 222, which is held at the charge voltage 216. From the charge voltage node 222, the combined charging current 404 flows along a path to the power storage unit 122, which can be implemented as a battery. At the first charger 126-1, the charging controller 128 is implemented as a buck charger controller 128-1 (BCC 128-1). The buck charger controller 128-1, or another control unit, drives a second charger-enable signal 602 along a second charger-enable path (not separately indicated) to activate the second charger 126-2 (of FIG. 6-2). The second charger 126-2 includes second charger circuitry 406-2. The second charger circuitry 406-2 is implemented as a charge pump including a flying capacitor $C_{FLY}$ and multiple power FETs (e.g., four power FETs). In some aspects, a current sensor, such as a current mirror, can include or be coupled to a power FET to sense a current flowing therethrough (e.g., any of the transistors 510-1 to 510-4, the QBAT transistor of the switch 514, any of the transistors of the charge pump of the second charger circuitry 406-2, and so forth). Additionally or alternatively, a current sensor can use a different transistor or another circuit component.

The illustrated example charging system 120 includes multiple currents and multiple indication signals that correspond to some of the currents. The indication signals can propagate over multiple indication paths. The first charger 126-1 includes a first input current 202-11 and a first charging current 202-12. The second charger 126-2 includes a second input current 202-21 and a second charging current 202-22. The first charger 126-1 also includes a first input-current indication signal 332-11 flowing along a first input-current indication path 334-11 and a first charging-current indication signal 332-12 flowing along a first charging-current indication path 334-12. The charging system 120 includes a second input-current indication path 334-21 and a second charging-current indication path 334-22. For clarity, the first input-current indication path 334-11 and the first charging-current indication path 334-12 are not explicitly depicted in FIG. 6-1. In operation, the second input-current indication path 334-21 carries a second input-current indication signal 332-21 that is indicative of a magnitude of the second input current 202-21. The second charging-current indication path 334-22 carries a second charging-current indication signal 332-22 that is indicative of a magnitude of the second charging current 202-22.

The charging controller 128—e.g., the buck charger controller 128-1—includes or is at least coupled to two indication signal combiners 302-3 and 302-5. If the four example indication signals 332-11, 332-12, 332-21, and 332-22 comprise current-based signals, the indication signal combiners can be realized using at least one resistor that accepts multiple current-based indication signals corresponding respectively to multiple chargers. If the four example indication signals 332-11 to 332-22 comprise voltage-based signals, the indication signal combiners can be realized using at least one summing amplifier that accepts multiple voltage-based indication signals corresponding respectively to multiple chargers. In other cases, the indication signals can have a combination of current-based and voltage-based signals between the input-current and the charging-current monitoring circuitry.

As shown, the buck charger controller 128-1 includes or is coupled to an input-current indication signal combiner 302-3 and a charging-current indication signal combiner 302-5. The input-current indication signal combiner 302-3 accepts and combines the first input-current indication signal 332-11 and the second input-current indication signal 332-21. Based on these two signals, the input-current indication signal combiner 302-3 produces a combined input-current indication signal 304-3. The buck charger controller 128-1 can therefore control the combined input current 402 (e.g., the combined wired input current 402-2 or the combined wireless input current 402-1) based on the combined input-current indication signal 304-3. For example, if the combined input-current indication signal 304-3 indicates that the first and second input currents 202-11 and 202-21 combined across the first and second chargers 126-1 and 126-2 have a joint magnitude that deviates too far from a target combined input-current magnitude (e.g., meets a maximum input current threshold), the buck charger controller 128-1 can increase or decrease the first input current 202-11. The change to the first input current 202-11 can reduce the deviation by adjusting at least one switching parameter controlling operation of the switch 510 (e.g., by controlling any one or more of the power transistors 510-1 to 510-4 using an associated respective driver).

For control that is based on a charging-current condition, a charging-current indication signal combiner 302-5 accepts and combines the first charging-current indication signal 332-12 and the second charging-current indication signal 332-22. Based on these two signals, the charging-current indication signal combiner 302-5 produces a combined charging-current indication signal 304-5. The buck charger controller 128-1 can therefore control the combined charging current 404 based on the combined charging-current indication signal 304-5. For example, if the combined charging-current indication signal 304-5 indicates that the first and second charging currents 202-12 and 202-22 combined across the first and second chargers 126-1 and 126-2 have a joint magnitude that deviates too far from a target combined charging-current magnitude, the buck charger controller 128-1 can increase or decrease the first charging current 202-12. The first charging current 202-12 can be increased or decreased to reduce the deviation by controlling operation of the switch 510 (e.g., any one or more of the power transistors 510-1 to 510-4).

Figure 7:
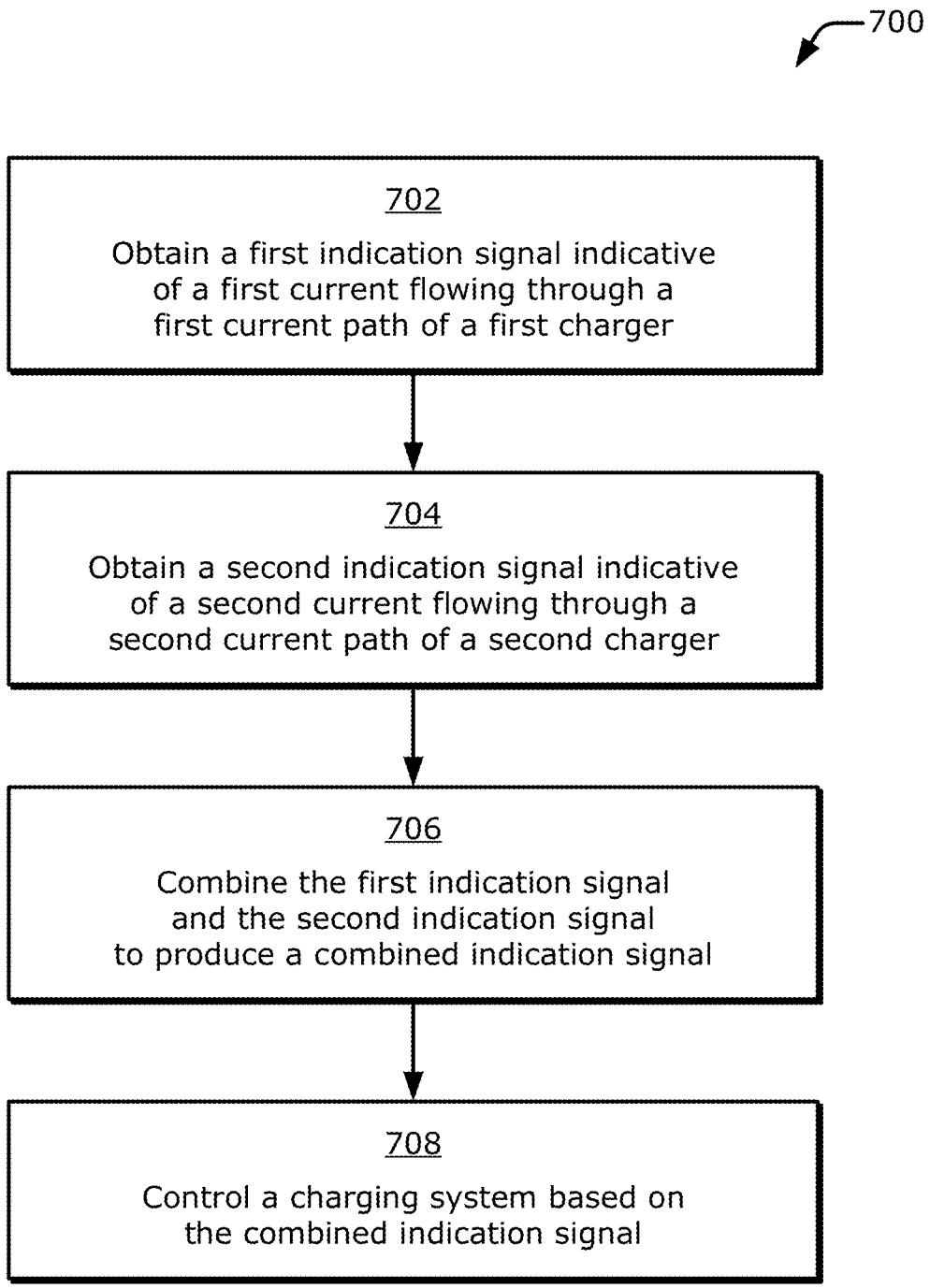
FIG. 7 is a flow diagram illustrating an example process for operating a parallel charging system.

FIG. 7 is a flow diagram illustrating an example process 700 for operating a parallel charging system. The process 700 is described in the form of a set of blocks 702-708 that specify operations that can be performed. However, operations are not necessarily limited to the order shown in FIG. 7 or described herein, for the operations may be implemented in alternative orders or in fully or partially overlapping manners. Also, more, fewer, and/or different operations may be implemented to perform the process 700, or an alternative process. Operations represented by the illustrated blocks of the process 700 may be performed by a charging system 120 or a portion thereof in conjunction with a charging controller 128.

At block 702, a first indication signal indicative of a first current flowing through a first current path of a first charger is obtained. For example, a charging system 120 can obtain a first indication signal 332-1 indicative of a first current 202-1 flowing through a first current path 206-1 of a first charger 126-1. A first current sensor 204-1, for instance, may sense the first current 202-1 and provide the sensed current as the first indication signal 332-1 via a first indication path 334-1.

At block 704, a second indication signal indicative of a second current flowing through a second current path of a second charger is obtained. For example, the charging system 120 can obtain a second indication signal 332-2 indicative of a second current 202-2 flowing through a second current path 206-2 of a second charger 126-2. For instance, a second current sensor 204-2 (e.g., a current mirror or at least one switching transistor) may sense the second current 202-2 and provide the sensed current as the second indication signal 332-2 on a second indication path 334-2. At least one magnitude of the first current 202-1 and the second current 202-2 may be encoded as a current-based signal or as a voltage-based signal respectively by the first indication signal 332-1 and the second indication signal 332-2.

At block 706, the first indication signal and the second indication signal are combined to produce a combined indication signal. For example, the charging system 120 can combine the first indication signal 332-1 and the second indication signal 332-2 to produce a combined indication signal 304. In some cases, an indication signal combiner 302 may combine the first indication signal 332-1 with the second indication signal 332-2 to generate the combined indication signal 304. This indication-signal combination may be performed with respect to distributed input currents. If so, an input-current indication signal combiner 302-3 may combine a first input-current indication signal 332-11 and a second input-current indication signal 332-21 to produce a combined input-current indication signal 304-3.

At block 708, the charging system is controlled based on the combined indication signal. For example, a charging controller 128 can control the charging system 120 based on the combined indication signal 304. To do so, the charging controller 128 may increase or decrease an individual current in the charging system 120 based on the combined indication signal 304 to change a combined input current 402 or a combined charging current 404. For instance, a buck charger controller 128-1 may open or close one or more switches 510 at a different rate or with a different duty cycle to change a magnitude of an individual current that forms a portion of a combined current. In some cases, the charging controller 128 may adjust a magnitude of the first current 202-1 to counteract a change to a magnitude of the second current 202-2.

As used herein, "couple," "coupled," or "coupling" refers to a relationship between two or more components that are in operative communication magnetically, electromagnetically, or by being electrically connected to implement some feature or realize some capability that is described. The term "connect," "connected," or "connecting" refers to an electrical connection using a physical line, such as a metal trace or wire. In some cases, an electrical connection can include a resistor, a capacitor, an inductor, a transistor, and so forth. A connection can include a direct connection or an indirect connection. A direct connection refers to connecting discrete circuit elements via a same node without an intervening element. An indirect connection refers to connecting discrete circuit elements via one or more other devices or other discrete circuit elements.

The terms "first," "second," "third," and other numeric-related indicators or differentiators are used herein to identify or distinguish similar or analogous items from one another within a given context. Here, such contexts can include a particular implementation, a given component, a single drawing figure or a group of related drawing figures, or a claim. Thus, a first item in one context may be the same as or may differ from a first item in another context. For example, an item identified as a "first charger" or a "first current" in one context may be identified for clarity purposes as a "second charger" or a "second current," respectively, in another context.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus for parallel charging, the apparatus comprising:
   a charging system comprising:
      a first charger comprising a first current path configured to propagate a first current;
      a second charger comprising a second current path configured to propagate a second current;
      a node combining the first current path and the second current path;
      a combined current path from the node to a power storage unit;
      a charging controller coupled to the first current path;
      a first indication path coupled between the first current path and the charging controller, the first indication path configured to indicate the first current separately from the second current; and
      a second indication path coupled between the second current path and the charging controller, the second indication path configured to indicate the second current separately from the first current.

2. The apparatus of claim 1, wherein:
   the first charger comprises a buck converter; and
   the second charger comprises a charge pump.

3. The apparatus of claim 1, wherein the charging system comprises:
   an indication signal combiner that is coupled:
      between the first indication path and the charging controller; and
      between the second indication path and the charging controller.

4. The apparatus of claim 3, wherein the indication signal combiner is configured to:
   accept a first indication signal of the first current flowing through the first current path;
   accept a second indication signal of the second current flowing through the second current path;
   combine the first indication signal of the first current flowing through the first current path and the second indication signal of the second current flowing through the second current path to produce a combined indication signal; and
   provide the combined indication signal to the charging controller.

5. The apparatus of claim 4, wherein:
the combined indication signal is responsive to a first magnitude of the first current flowing through the first current path and a second magnitude of the second current flowing through the second current path; and
the charging controller is configured to control at least one switching parameter of the first charger based on the combined indication signal.

6. The apparatus of claim 4, wherein:
the charging system comprises:
a third charger comprising a third current path configured to propagate a third current,
the third current path coupled to the node; and
a third indication path coupled between the third current path and the indication signal combiner, the third indication path configured to indicate the third current separately from the first current and the second current using a third indication signal; and
the indication signal combiner is configured to:
accept the third indication signal of the third current flowing through the third current path; and
combine the first indication signal of the first current flowing through the first current path, the second indication signal of the second current flowing through the second current path, and the third indication signal of the third current flowing through the third current path to produce the combined indication signal.

7. The apparatus of claim 1, wherein the charging controller is:
separate from the first charger and separate from the second charger; or
integrated with the first charger and separate from the second charger.

8. The apparatus of claim 1, wherein the charging controller is configured to control operation of at least the first charger based on the first current flowing through the first current path and the second current flowing through the second current path.

9. The apparatus of claim 1, wherein:
the second charger comprises a second current sensor, the second current sensor coupled between the second current path and the second indication path.

10. The apparatus of claim 9, wherein:
the second current sensor is configured to provide, to the charging controller via the second indication path, a second indication signal indicative of the second current flowing through the second current path; and
the charging controller is configured to control a combined current of the charging system based on the second indication signal.

11. The apparatus of claim 10, wherein:
the second current comprises at least one of a second input current or a second charging current; and
the combined current comprises at least one of a combined input current or a combined charging current.

12. The apparatus of claim 10, further comprising:
the power storage unit; and
a power source adapter,
wherein the second current path comprises at least one of:
a second input-current path coupled to the power source adapter; or
a second charging-current path coupled to the power storage unit.

13. The apparatus of claim 10, wherein:
the first charger comprises a first current sensor, the first current sensor coupled between the first current path and the first indication path.

14. The apparatus of claim 13, wherein:
the first current sensor is configured to provide, to the charging controller via the first indication path, a first indication signal indicative of the first current flowing through the first current path; and
the charging controller is configured to control the combined current of the charging system based on the first indication signal and the second indication signal.

15. The apparatus of claim 14, wherein the charging system comprises:
an indication signal combiner coupled to the first indication path and the second indication path, the indication signal combiner configured to:
combine at least the first indication signal and the second indication signal to produce a combined indication signal; and
provide the combined indication signal to the charging controller.

16. The apparatus of claim 1, further comprising:
a first printed circuit board comprising the first charger; and
a second printed circuit board comprising the second charger.

17. The apparatus of claim 1,
wherein the charging system is configured to charge the power storage unit.

18. The apparatus of claim 17, further comprising:
a display screen coupled to the power storage unit; and
a processor coupled to the power storage unit, the processor operatively coupled to the display screen and configured to present one or more graphical images on the display screen,
wherein the power storage unit is configured to provide power to the display screen and the processor.

19. The apparatus of claim 1, wherein:
the first charger comprises a first current sensor, the first current sensor coupled between the first current path and the first indication path;
the second charger comprises a second current sensor, the second current sensor coupled between the second current path and the second indication path;
the first current sensor is configured to provide, to the charging controller via the first indication path, a first indication signal comprising a scaled version of the first current; and
the second current sensor is configured to provide, to the charging controller via the second indication path, a second indication signal comprising a scaled version of the second current.

20. An apparatus for charging at least one power storage unit, the apparatus comprising:
a first charger comprising means for propagating a first current at least partially through the first charger;
a second charger comprising means for propagating a second current at least partially through the second charger;
means for combining the means for propagating the first current and the means for propagating the second current;
a combined current path from the means for combining to the at least one power storage unit;
first means for indicating the first current separately from the second current;

second means for indicating the second current separately from the first current;

means for generating a combined indication signal responsive to the first means for indicating and the second means for indicating; and means for controlling a charging of the at least one power storage unit based on the combined indication signal.

21. The apparatus of claim 20, wherein the means for controlling comprises at least one of:

means for regulating at least one charging current to provide constant-current charging;

means for regulating at least one input current to protect at least one power source adapter; or means for regulating a voltage corresponding to the at least one power storage unit.

22. The apparatus of claim 20, wherein the second means for indicating the second current comprises:

means for sensing the second current in the second charger to produce a second indication signal; and means for propagating the second indication signal to the means for generating.

23. A method for operating a charging system, the method comprising:

sensing a first current flowing through a first current path of a first charger separately from a second current to produce a first indication signal;

sensing the second current flowing through a second current path of a second charger separately from the first current to produce a second indication signal;

propagating the first indication signal along a first indication path separately from the second indication signal;

propagating the second indication signal along a second indication path separately from the first indication signal;

combining the first indication signal and the second indication signal to produce a combined indication signal; and controlling the charging system based on the combined indication signal.

24. The method of claim 23, wherein the controlling comprises:

adjusting a combined current based on the combined indication signal, the combined current corresponding to at least the first current and the second current.

25. The method of claim 24, wherein the adjusting comprises at least one of:

adjusting the first current to maintain the combined current substantially within a target range for the combined current; or adjusting the first current to counteract a change to the second current.

26. The method of claim 23, further comprising:

propagating the first current of the first charger to a node; and propagating the second current from the second charger to the node.

27. The method of claim 23, wherein the controlling comprises:

adjusting at least one switching parameter of the first charger based on the combined indication signal.

28. An apparatus for parallel charging, the apparatus comprising:

a charging system comprising:
a buck charger comprising
a first current path, the first current path coupled to a charging voltage node and configured to propagate a first current;
a charge pump charger comprising
a second current path, the second current path coupled to the charging voltage node and configured to propagate a second current;
a node combining the first current path and the second current path;
a combined current path from the node to a power storage unit;
a charging controller coupled to the first current path;
a first indication path coupled between the charging controller and the first current path, the first indication path configured to provide a first indication signal of the first current separately from the second current; and
a second indication path coupled between the charging controller and the second current path, the second indication path configured to provide a second indication signal of the second current separately from the first current.

29. The apparatus of claim 28, wherein:

the charge pump charger comprises a current sensor, the current sensor coupled between the second current path configured to propagate the second current and the second indication path.

30. The apparatus of claim 28, wherein at least one of:

the first current path comprises a first input-current path, and the second current path comprises a second input-current path; or the first current path comprises a first charging-current path, and the second current path comprises a second charging-current path.

* * * * *